(12) United States Patent
Inagaki et al.

(10) Patent No.: US 8,349,495 B2
(45) Date of Patent: Jan. 8, 2013

(54) NONAQUEOUS BATTERY WITH COMPOSITE NEGATIVE ELECTRODE

(75) Inventors: Hiroki Inagaki, Kawasaki (JP); Hideaki Morishima, Ichikawa (JP); Norio Takami, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1190 days.

(21) Appl. No.: 11/387,776

(22) Filed: Mar. 24, 2006

(65) Prior Publication Data

US 2007/0072080 A1 Mar. 29, 2007

(30) Foreign Application Priority Data

Sep. 29, 2005 (JP) .................................. 2005-283633

(51) Int. Cl.
- H01M 10/0564 (2010.01)
- H01M 4/131 (2010.01)
- H01M 4/485 (2010.01)
- H01M 4/525 (2010.01)

(52) U.S. Cl. ............. 429/231.95; 429/231.5; 429/218.1; 429/224; 429/324; 429/338

(58) Field of Classification Search ....... 429/218.1–224, 429/231.1–231.95
See application file for complete search history.

(56) References Cited

U.S. PATENT DOCUMENTS

| | | | | |
|---|---|---|---|---|
| 5,998,063 A | * | 12/1999 | Kobayashi et al. | ......... 429/218.1 |
| 6,255,020 B1 | * | 7/2001 | Yamashita et al. | ....... 429/231.95 |
| 6,322,921 B1 | * | 11/2001 | Iwaizono et al. | ............... 429/56 |
| 6,489,062 B1 | * | 12/2002 | Watanabe et al. | ....... 429/231.95 |
| 2004/0234856 A1 | | 11/2004 | Morigaki et al. | |
| 2005/0064282 A1 | | 3/2005 | Inagaki et al. | |
| 2005/0069777 A1 | | 3/2005 | Takami et al. | |
| 2005/0147889 A1 | * | 7/2005 | Ohzuku et al. | ............. 429/231.1 |
| 2005/0221173 A1 | | 10/2005 | Tatebayashi et al. | |
| 2005/0221187 A1 | | 10/2005 | Inagaki et al. | |
| 2005/0221188 A1 | | 10/2005 | Takami et al. | |
| 2006/0046155 A1 | | 3/2006 | Inagaki et al. | |
| 2006/0134520 A1 | | 6/2006 | Ishii et al. | |
| 2008/0070115 A1 | | 3/2008 | Saruwatari et al. | |

FOREIGN PATENT DOCUMENTS

| | | |
|---|---|---|
| JP | 7-302587 | 11/1995 |
| JP | 11-7944 | 1/1999 |
| JP | 2000-173586 | 6/2000 |
| JP | 2001-243952 | 9/2001 |
| JP | 2001-250554 | 9/2001 |
| JP | 2001250554 A * | 9/2001 |
| JP | 2005-150093 | 6/2005 |

OTHER PUBLICATIONS

U.S. Appl. No. 11/687,844, filed Mar. 19, 2007, Fujita, et al.

(Continued)

*Primary Examiner* — Keith Walker
(74) *Attorney, Agent, or Firm* — Oblon, Spivak, McClelland, Maier & Neustadt, L.L.P.

(57) ABSTRACT

A nonaqueous electrolyte battery includes a positive electrode, a negative electrode containing a lithium-titanium composite oxide and a lithium-absorbing material in a weight ratio falling within the range defined in formula (1) given below, and a nonaqueous electrolyte. The lithium-absorbing material has a lithium absorption potential nobler than a lithium absorption potential of the lithium-titanium composite oxide.

$$3 \leq (A/B) \leq 100 \qquad (1)$$

Where A denotes the weight (parts by weight) of the lithium-titanium composite oxide, and B denotes the weight (parts by weight) of the lithium-absorbing material.

30 Claims, 8 Drawing Sheets

OTHER PUBLICATIONS

U.S. Appl. No. 11/687,860, filed Mar. 19, 2007, Fujita, et al.
U.S. Appl. No. 11/694,454, filed Mar. 30, 2007, Inagaki, et al.
U.S. Appl. No. 12/428,803, filed Apr. 23, 2009, Matsuno, et al.
U.S. Appl. No. 11/756,259, filed May 31, 2007, Saruwatari, et al.
U.S. Appl. No. 11/855,587, filed Sep. 14, 2007, Inagaki, et al.
U.S. Appl. No. 11/940,688, filed Nov. 15, 2007, Inagaki, et al.
U.S. Appl. No. 11/230,635, filed Sep. 21, 2005, Norio Takami, et al.
U.S. Appl. No. 11/260,410, filed Oct. 28, 2005, Hiroki Inagaki, et al.
U.S. Appl. No. 11/228,430, filed Sep. 19, 2005, Hiroki Inagaki, et al.
U.S. Appl. No. 11/260,435, filed Oct. 28, 2005, Norio Takami, et al.
U.S. Appl. No. 11/230,482, filed Sep. 21, 2005, Norio Takami, et al.
U.S. Appl. No. 11/261,538, filed Oct. 31, 2005, Hiroki Inagaki, et al.
U.S. Appl. No. 11/257,040, filed Oct. 25, 2005, Hiroki Inagaki, et al.
U.S. Appl. No. 11/470,482, filed Sep. 6, 2006, Takami, et al.
U.S. Appl. No. 11/531,142, filed Sep. 12, 2006, Morishima, et al.
U.S. Appl. No. 12/512,540, filed Jul. 30, 2009, Inagaki, et al.
U.S. Appl. No. 13/181,211, filed Jul. 12, 2011, Inagaki, et al.
English translation of JP 2001-250554, filed Mar. 2, 2000. JP 2001-250554, in the Japanese language, was previously cited in an Information Disclosure Statement filed Dec. 9, 2009.

* cited by examiner

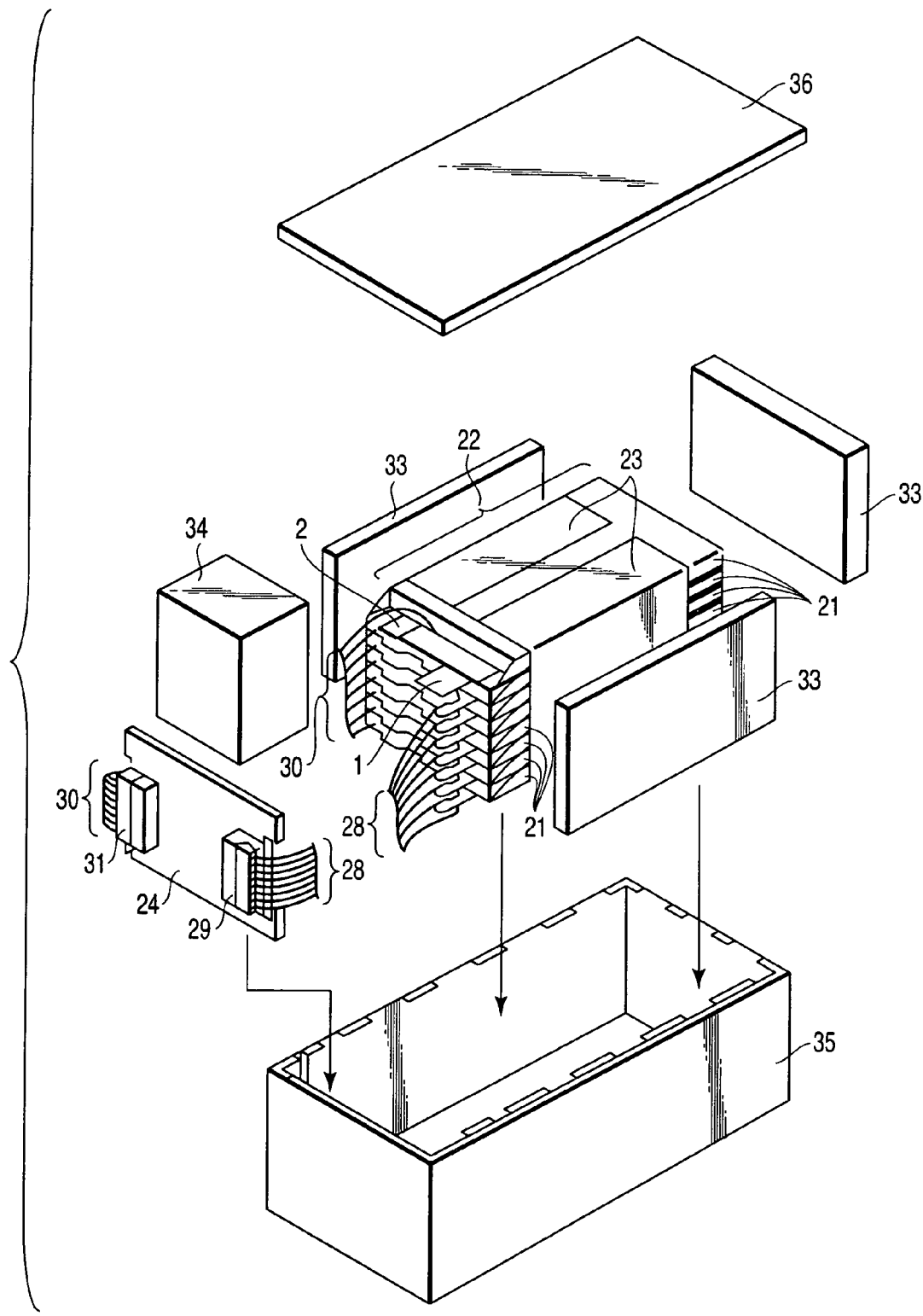
F I G. 5

NONAQUEOUS BATTERY WITH COMPOSITE NEGATIVE ELECTRODE

CROSS-REFERENCE TO RELATED APPLICATIONS

This application is based upon and claims the benefit of priority from prior Japanese Patent Application No. 2005-283633, filed Sep. 29, 2005, the entire contents of which are incorporated herein by reference.

BACKGROUND OF THE INVENTION

1. Field of the Invention

The present invention relates to a nonaqueous electrolyte battery, a battery pack using the nonaqueous electrolyte battery, and a vehicle having the battery pack mounted thereto.

2. Description of the Related Art

A nonaqueous electrolyte battery is charged and discharged by the migration of lithium ions between the negative electrode and the positive electrode. Research is being conducted in an attempt to develop a nonaqueous electrolyte battery as a battery having high energy density.

Nowadays, a nonaqueous electrolyte battery comprising a lithium-transition metal composite oxide used as a positive electrode active material and a carbonaceous material used as a negative electrode active material has been commercialized. In general, Co, Mn, Ni, etc., are used as the transition metal included in the lithium-transition metal composite oxide.

In recent years, a nonaqueous electrolyte battery comprising a lithium-titanium composite oxide as the negative electrode active material has been put to practical use. The lithium-titanium composite oxide has a Li absorption-release potential higher than that of the carbonaceous material. Also, the lithium-titanium composite oxide is small in change of the volume accompanying the charge-discharge operation and, thus, is excellent in the charge-discharge cycle characteristics. Among the lithium-titanium composite oxides, the lithium-titanium oxide having the spinel structure offers particular hope for further improving the nonaqueous electrolyte battery.

For example, Japanese Patent Application KOKAI Publication No. 07-302587 discloses a nonaqueous electrolyte lithium secondary battery in which a mixture of the lithium-titanium oxide having the spinel structure and $Nb_2O_5$ is used as the negative electrode. The secondary battery disclosed in this prior art is intended to obtain excellent charge-discharge cycle characteristics by utilizing the feature of the lithium-titanium oxide having the spinel structure. At the same time, the secondary battery is intended to moderate the rapid drop of the battery voltage that is generated in the end period of the discharge of the secondary battery in the case where the lithium-titanium oxide having the spinel structure is used in the negative electrode. Therefore, use is made of $Nb_2O_5$ that is relatively close to the lithium-titanium oxide in the potential in the stage of releasing lithium ions and that is small in the change of the potential. For achieving these objects, the lithium-titanium oxide and $Nb_2O_5$ are mixed at a ratio of 60:30 by weight in the Example described in the patent document quoted above. To be more specific, the weight ratio X/Y of the weight X of the lithium-titanium oxide to the weight Y of $Nb_2O_5$ in the negative electrode is set at 2.

However, it was impossible to obtain excellent charge-discharge cycle characteristics in the secondary battery disclosed in Japanese Patent Application KOKAI Publication No. 07-302587 quoted above because the negative electrode was constructed to contain a large amount of $Nb_2O_5$ relative to the amount of the lithium-titanium oxide.

BRIEF SUMMARY OF THE INVENTION

An object of the present invention is to provide a nonaqueous electrolyte battery that permit improving the charge-discharge cycle characteristics, a battery pack using the nonaqueous electrolyte battery, and a vehicle using the battery pack.

According to a first aspect of the present invention, there is provided a nonaqueous electrolyte battery, comprising:
a positive electrode;
a negative electrode containing a lithium-titanium composite oxide and a lithium-absorbing material in a weight ratio falling within a range defined in formula (1) given below, and the lithium-absorbing material having a lithium absorption potential nobler than a lithium absorption potential of the lithium-titanium composite oxide; and
a nonaqueous electrolyte;

$$3 \leq (A/B) \leq 100 \tag{1}$$

where A denotes the weight (parts by weight) of the lithium-titanium composite oxide, and B denotes the weight (parts by weight) of the lithium-absorbing material.

According to a second aspect of the present invention, there is provided a battery pack including a battery module of nonaqueous electrolyte batteries, each nonaqueous electrolyte battery comprising:
a positive electrode;
a negative electrode containing a lithium-titanium composite oxide and a lithium-absorbing material in a weight ratio falling within a range defined in formula (1) given below, and the lithium-absorbing material having a lithium absorption potential nobler than a lithium absorption potential of the lithium-titanium composite oxide; and
a nonaqueous electrolyte;

$$3 \leq (A/B) \leq 100 \tag{1}$$

where A denotes the weight (parts by weight) of the lithium-titanium composite oxide, and B denotes the weight (parts by weight) of the lithium-absorbing material.

According to a third aspect of the present invention, there is provided a vehicle comprising a battery pack including a battery module of nonaqueous electrolyte batteries, each nonaqueous electrolyte battery comprising:
a positive electrode;
a negative electrode containing a lithium-titanium composite oxide and a lithium-absorbing material in a weight ratio falling within a range defined in formula (1) given below, and the lithium-absorbing material having a lithium absorption potential nobler than a lithium absorption potential of the lithium-titanium composite oxide; and
a nonaqueous electrolyte;

$$3 \leq (A/B) \leq 100 \tag{1}$$

where A denotes the weight (parts by weight) of the lithium-titanium composite oxide, and B denotes the weight (parts by weight) of the lithium-absorbing material.

BRIEF DESCRIPTION OF THE SEVERAL VIEWS OF THE DRAWING

FIG. 5 is an oblique view showing in a dismantled fashion the construction of a battery pack according to another embodiment of the present invention;

DETAILED DESCRIPTION OF THE INVENTION

As a result of extensive research, the present inventors have found that the problem described below is exhibited in a secondary battery in which a lithium-titanium composite oxide is used as the negative electrode active material.

Figure 10:
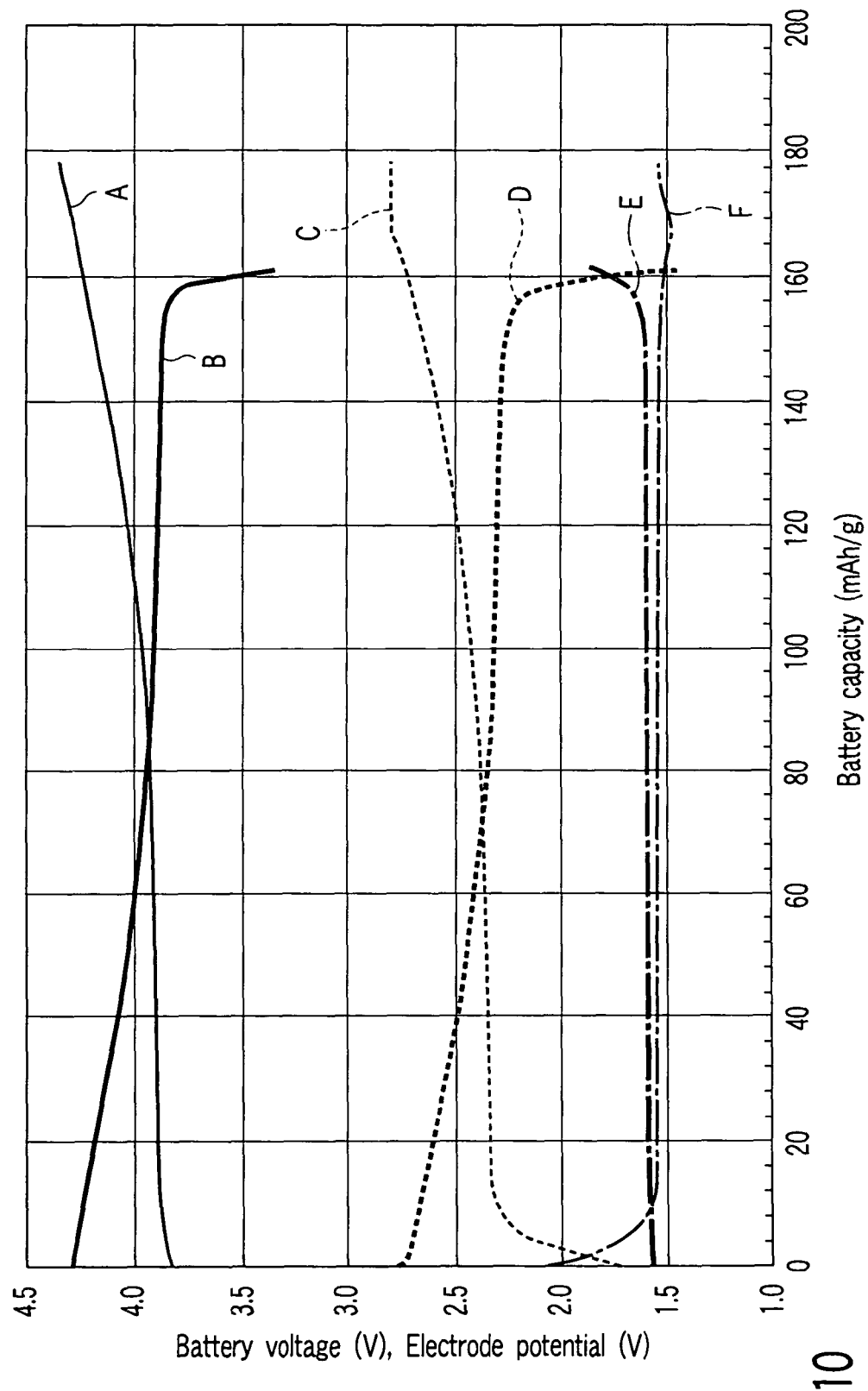
FIG. 10 is a graph showing the charge-discharge curves of the secondary battery for Comparative Example 2.

The lithium-titanium composite oxide is small in the change of volume accompanying the absorption and release of lithium and is excellent in the charge-discharge cycle characteristics. However, lithium-titanium composite oxide has a high initial charge-discharge efficiency. On the other hand, the initial charge-discharge efficiency of the positive electrode, in which a 4V-class transition metal oxide represented by a lithium-cobalt composite oxide is used as the positive electrode active material, is low. Where such a positive electrode is used in combination with a lithium-titanium composite oxide, the positive electrode potential is markedly lowered in the end period of the discharge. In other words, the end of the discharge potential of the positive electrode is lowered. FIG. 10 is a graph showing the particular state. In the graph of FIG. 10, the battery capacity (mAh/g) is plotted on the abscissa, and the battery voltage (V) or the electrode potential (V) is plotted on the ordinate. In the graph of FIG. 10, curve A denotes the positive electrode potential (charging), curve B denotes the positive electrode potential (discharging), curve C denotes the battery voltage (charging), curve D denotes the battery voltage (discharging), curve E denotes the negative electrode potential (discharging), and curve F denotes the negative electrode potential (charging).

The battery is set to be cut off if the discharge voltage (curve D) is decreased to a level lower than a prescribed value (i.e., 1.5 V in this case). As shown in FIG. 10, the positive electrode potential (curve B) is markedly lowered to a level in the vicinity of 3 V (vs. Li/Li$^+$) before the negative electrode potential (curve E) is elevated in the end period of the discharge. As a result, the battery voltage (curve D) is caused to be lowered by the decrease of the discharge potential of the positive electrode so that the battery is cut off. In other words, the battery is under the state of the regulation by the positive electrode.

For example, the initial charge-discharge efficiency of the lithium-titanium oxide having the spinel structure is 97%. On the other hand, the positive electrode in which a lithium-nickel containing composite oxide is used as the positive electrode active material exhibits the initial charge-discharge efficiency of about 85 to 90%, which is lower by about 10% than the initial charge-discharge efficiency of the lithium-titanium oxide having the spinel structure. In the secondary battery using, in combination, the positive electrode and the lithium-titanium oxide having the spinel structure, the positive electrode potential in the end period of the discharge is lowered to a level in the vicinity of 3 V (vs. Li/Li$^+$) or is sometimes made lower than 3 V (vs. Li/Li$^+$), even if the secondary battery is used as usual. If the charge-discharge cycle is repeated under the potential lower than the vicinity of 3 V (vs. Li/Li$^+$), the capacity of the positive electrode is markedly decreased because of the collapse of the crystal structure. Such being the situation, it is impossible to obtain excellent charge-discharge cycle characteristics of the secondary battery.

As described above, where the initial charge-discharge efficiency of the negative electrode active material is higher than that of the positive electrode active material, the battery is cut off in the end period of the discharge under the regulation by the positive electrode. In this case, the positive electrode potential in the end period of the discharge is lowered to a level in the vicinity of 3 V (vs. Li/Li$^+$) so as to put the positive electrode under an over-discharge state. Therefore, the deterioration of the positive electrode is accelerated, and the battery performance is lowered by the deterioration of the positive electrode. In other words, it is desirable to use the positive electrode in a region in which a rapid change is not generated in the positive electrode potential in the end period of the discharge, i.e., a region in which a shoulder of the positive electrode discharge curve is not generated in the end period of the discharge.

In the embodiment of the present invention, a lithium-titanium composite oxide used as a negative electrode active material and a lithium-absorbing material that has a Li absorption potential nobler than that of the lithium-titanium composite oxide are contained in the negative electrode. The lithium ions released from the positive electrode active material in the charging stage are absorbed first by the lithium-absorbing material and, then, by the lithium-titanium composite oxide. In the stage of the discharge, the lithium ions are released from mainly lithium-titanium composite oxide alone so as to be absorbed by the positive electrode active material. As a result, the initial charge-discharge efficiency of the negative electrode is lowered so as to permit the positive electrode and the negative electrode to be balanced in the initial charge-discharge efficiency, thereby succeeding in the formation of the discharge state that is regulated by the negative electrode. As a result, the end of the discharge potential of the positive electrode is elevated so as to suppress the collapse of the crystal structure of the positive electrode and to improve the charge-discharge cycle characteristics of the secondary battery.

Incidentally, in the case of the regulation by the negative electrode, the end of the discharge potential of the negative electrode is elevated to about 2 to 2.5 V (vs. Li/Li$^+$). In general, the lithium-titanium composite oxide exhibits satisfactory charge-discharge cycle characteristics under the potential of 1 to 3 V (vs. Li/Li$^+$). It follows that the lithium-titanium composite oxide permits absorbing-releasing lithium within a suitable potential range under the discharge state regulated by the negative electrode, thereby realizing good charge-discharge cycle characteristics.

However, if the weight ratio (A/B) of the lithium-titanium composite oxide to the lithium-absorbing material exceeds 100, it is impossible to obtain the effect described above. On the other hand, if the weight ratio (A/B) noted above is smaller than 3, the change in volume of the negative electrode accompanying the absorption-release of lithium is enlarged, resulting in failure to obtain excellent charge-discharge cycle characteristics of the secondary battery. Also, the amount of lithium ions released from the negative electrode tends to be rendered excessively small, resulting in failure to obtain a large capacity possibly. It is more desirable for the weight ratio (A/B) to fall within not smaller than 3 to not larger than 50, furthermore preferably not smaller than 3 to not larger than 20.

It is desirable for the lithium-absorbing material to have a Li absorption potential not lower than 1.8 V (vs. Li/Li$^+$), i.e., a potential nobler by 1.8 V or more than the metal lithium potential. If the Li absorption potential of the lithium-absorbing material is set at 1.8 V (vs. Li/Li$^+$) or more, the lithium-absorbing material is put under the state that the lithium-absorbing material itself does not contribute to the charge-discharge cycles following the first charge-discharge cycle. As a result, it is possible to realize particularly excellent charge-discharge cycle characteristics of the secondary battery without impairing the excellent charge-discharge cycle life of the lithium-titanium composite oxide. The Li absorption potential of the lithium-absorbing material should desirably be 2.0 V (vs. Li/Li$^+$) or more, more desirably 2.5 V (vs. Li/Li$^+$) or more. Also, the upper limit of the Li absorption potential of the lithium-absorbing material is lower than the Li releasing potential of the positive electrode. To be more specific, the upper limit noted above should desirably be 4.0 V (vs. Li/Li$^+$). By setting the Li absorption potential of the lithium-absorbing material at 4.0 V (vs. Li/Li$^+$) or less, it is possible to improve the lithium absorption capability of the lithium-absorbing material. It is more desirable for the upper limit of the Li absorption potential of the lithium-absorbing material to be set at 3.5 V (vs. Li/Li$^+$).

Some embodiments of the present invention will now be described with reference to the accompanying drawings. Common constituents of the embodiments are denoted by the same reference numerals in the embodiments described in the following so as to avoid overlapping description. Also, the accompanying drawings are no more than schematic drawings for facilitating the description and understanding of the present invention. The shape, size, ratio, etc., shown in the drawings may differ from those of the actual apparatus and can be changed appropriately in view of the description given below and the known technology.

Figure 1:
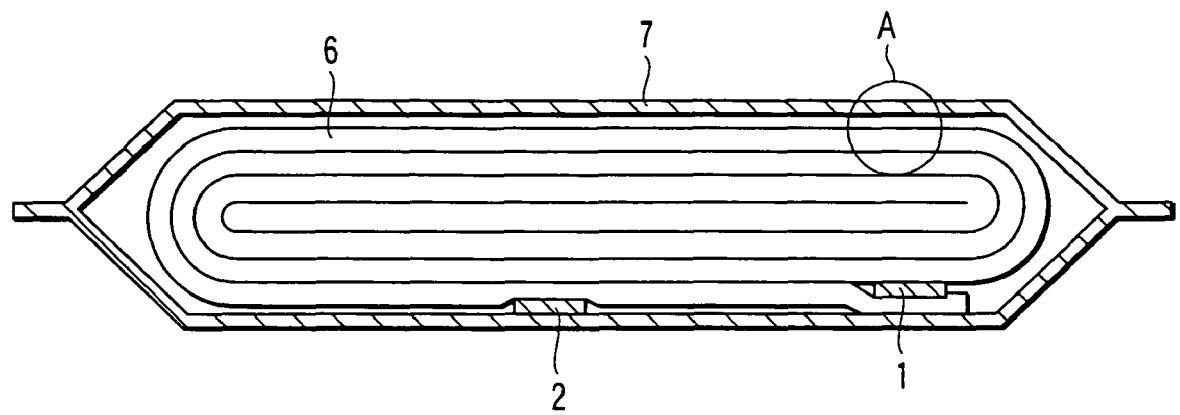
FIG. 1 is a cross-sectional view schematically showing the construction of a flat type nonaqueous electrolyte secondary battery according to one embodiment of the present invention.
Figure 2:
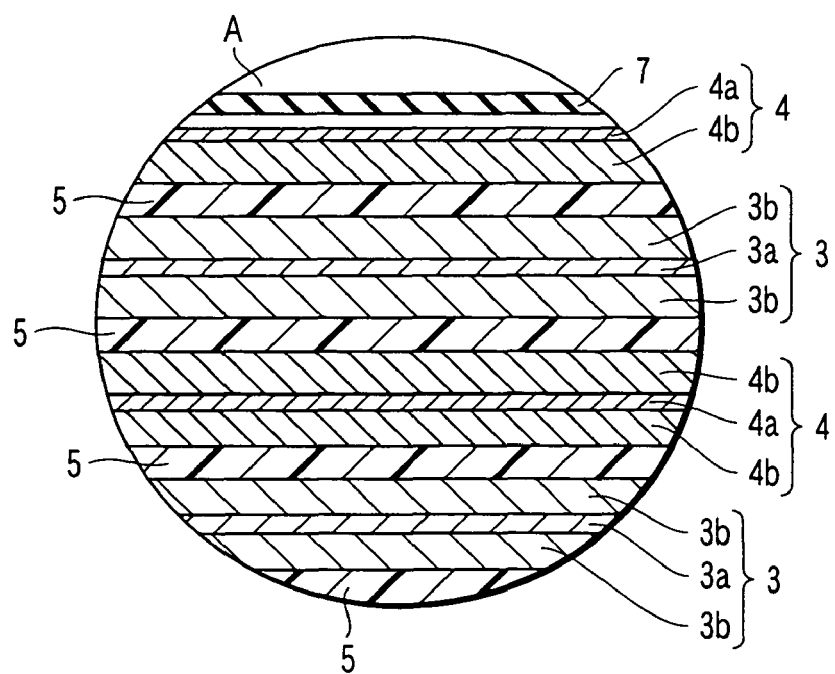
FIG. 2 is a cross-sectional view schematically showing in detail in a magnified fashion the construction in the circular region A shown in FIG. 1 of the nonaqueous electrolyte secondary battery.

FIGS. 1 and 2 collectively show as an example the construction of the nonaqueous electrolyte battery according to one embodiment of the present invention, wherein FIG. 1 is a cross-sectional view schematically showing the construction of a flat type nonaqueous electrolyte secondary battery according to one embodiment of the present invention, and FIG. 2 is a cross-sectional view schematically showing in detail the construction in the circular region A shown in FIG. 1 of the nonaqueous electrolyte secondary battery.

As shown in FIG. 1, the spirally wound electrode group 6 that is shaped flat is housed in the case 7. The wound electrode group 6 is prepared by spirally winding a laminate structure including of the positive electrode 3, the negative electrode 4 and the separator 5 interposed between the positive electrode 3 and the negative electrode 4. The nonaqueous electrolyte is held by the wound electrode group 6.

As shown in FIG. 2, the positive electrode 3 and the negative electrode 4 are laminated one upon the other with the separator 5 interposed therebetween. The negative electrode 4 is positioned in the outermost circumferential region of the wound electrode group 6. Laminated on the inner circumferential side of the negative electrode 4 are the separator 5, the positive electrode 3, the separator 5, the negative electrode 4, the separator 5, the positive electrode 3 and the separator 5 in the order mentioned. The negative electrode 4 comprises a negative electrode current collector 4a and negative electrode active material-containing layers 4b formed on both sides of the negative electrode current collector 4a. In that region of the negative electrode 4 which is positioned in the outermost circumferential portion, the negative electrode active material-containing layer 4b is formed on only one surface of the negative electrode current collector 4a. Likewise, the positive electrode 3 comprises a positive electrode current collector 3a and positive electrode active material-containing layers 3b formed on both surfaces of the positive electrode current collector 3a.

As shown in FIG. 1, a band-like positive electrode terminal 1 is electrically connected to the positive electrode current collector 3a in the vicinity of the end portion of the outermost circumferential of the wound electrode group 6. On the other hand, a band-like negative electrode terminal 2 is electrically connected to the negative electrode current collector 4a in the vicinity of the end portion of the outermost circumferential of the wound electrode group 6. The tip portions of the positive electrode terminal 1 and the negative electrode terminal 2 are withdrawn to the outside from the same side of the case 7.

The negative electrode, the nonaqueous electrolyte, the positive electrode, the separator, the case, the positive electrode terminal and the negative electrode terminal included in the nonaqueous electrolyte battery of the embodiment of the present invention will now be described in detail.

1) Negative Electrode

The negative electrode comprises a negative electrode current collector, and a negative electrode active material-containing layer or layers formed on one surface or both surfaces of the negative electrode current collector. The negative electrode active material-containing layer contains a lithium-titanium composite oxide, a lithium-absorbing material, a negative electrode electronic conductor, and a binder. In the negative electrode, the lithium-titanium composite oxide and the lithium-absorbing material are present in the form of a mixture. The states of the lithium-titanium composite oxide and the lithium-absorbing material can be confirmed by the X-ray peaks. Where the lithium-titanium composite oxide and the lithium-absorbing material are present in the form of a mixture, it is possible to detect two peaks which are the X-ray peak derived from the lithium-titanium composite oxide and the X-ray peak derived from the lithium-absorbing material.

The lithium-titanium composite oxide is used as the negative electrode active material because the lithium-titanium composite oxide exhibits a very high initial charge-discharge efficiency. The embodiment of the present invention is particularly effective in the case where the lithium-titanium composite oxide is used in combination with the positive electrode in which a lithium-nickel containing composite oxide is used as the positive electrode active material.

The lithium-titanium composite oxide used in the embodiment of the present invention includes, for example, a titanium based oxide, a lithium-titanium oxide, and a lithium-titanium oxide in which the constituting element of the lithium-titanium oxide is replaced by another element or other elements. The titanium based oxide noted above includes, for example, $TiO_2$. The lithium-titanium oxide noted above includes, for example, a lithium-titanium oxide having the spinel structure or the ramsdellite structure. The lithium-titanium oxide having the spinel structure noted above includes, for example, $Li_{4+x}Ti_5O_{12}$ ($0 \leq x \leq 3$) The lithium-titanium oxide having the ramsdellite structure noted above includes, for example, $Li_{2+y}Ti_3O_7$ ($0 \leq y \leq 3$). The titanium based oxide noted above, which includes $TiO_2$ as pointed out above, also includes, for example, a titanium-containing metal composite oxide containing Ti element and at least one additional element selected from the group consisting of P, V, Sn, Cu, Ni, Fe and Co, e.g., $TiO_2$—$P_2O_5$, $TiO_2$—$V_2O_5$, $TiO_2$—$P_2O_5$—$SnO_2$, $TiO_2$—$P_2O_5$—MeO (where Me denotes at least one element selected from the group consisting of Cu, Ni, Fe and Co). It is desirable for the titanium-containing metal composite oxide noted above to have a micro-structure in which a crystalline phase and an amorphous phase are present together or a micro-structure in which an amorphous phase is present singly. Where the titanium-containing metal composite oxide has such a micro-structure, it is possible to achieve a substantially high capacity in the high rate charge-discharge operation. It is also possible to markedly improve the charge-discharge cycle performance of the secondary battery.

In view of the cycle life, it is desirable for the lithium-titanium composite oxide to be provided by a lithium-titanium oxide having the spinel structure. Particularly, it desirable to use $Li_{4+x}Ti_5O_{12}$ ($0 \leq x \leq 3$) having the spinel structure, which exhibits a particularly excellent initial charge-discharge efficiency, as the lithium-titanium composite oxide. By using $Li_{4+x}Ti_5O_{12}$ ($0 \leq x \leq 3$) as the lithium-titanium composite oxide, the effect of improving the charge-discharge cycle characteristics of the secondary battery can be produced prominently in this embodiment. Also, in the case of using $Li_{4+x}Ti_5O_{12}$ ($0 \leq x \leq 3$) as the lithium-titanium composite oxide, distortion is not generated in the stage of releasing Li, i.e., the crystal structure is not changed. It follows that $Li_{4+x}Ti_5O_{12}$ ($0 \leq x \leq 3$) is unlikely to be affected by the negative electrode potential so as to make $Li_{4+x}Ti_5O_{12}$ ($0 \leq x \leq 3$) suitable for use as the lithium-titanium composite oxide.

The battery performance is lowered prominently in the case where the average particle size of the lithium-titanium composite oxide is not larger than 1 μm. It should be noted that, if the average particle size of the lithium-titanium composite oxide is decreased, the initial charge-discharge efficiency of the lithium-titanium composite oxide itself is further increased so as to lower prominently the battery performance. It should also be noted, however, that it is desirable to set the lower limit of the average particle size of the lithium-titanium composite oxide at 0.001 μm in order to suppress the phenomenon that the nonaqueous electrolyte is distributed mainly on the side of the negative electrode and to prevent the depletion of the nonaqueous electrolyte on the positive electrode.

It is desirable for the lithium-titanium composite oxide to have an average particle size not larger than 1 μm and to have a specific surface area of not smaller than 5 m$^2$/g to not larger than 50 m$^2$/g as determined by the BET method utilizing the $N_2$ adsorption. Where the average particle size and the specific surface area of the lithium-titanium composite oxide fall within the ranges given above, the utilization rate of the lithium-titanium composite oxide can be enhanced, and it is possible to achieve a substantially high capacity even under a high rate charge-discharge operation.

In order to suppress the over-discharge of the positive electrode described above, the negative electrode is allowed to contain a lithium-absorbing material capable of absorbing Li under a potential nobler than the Li absorption potential of the lithium-titanium composite oxide.

The lithium-absorbing material contained in the negative electrode includes, for example, a titanium based oxide, a manganese based oxide, a molybdenum based oxide, a vanadium based oxide, a niobium based oxide and a copper based oxide. Particularly, it is desirable to use the niobium based oxide, the molybdenum based oxide, the manganese based oxide, the copper based oxide and the vanadium based oxide as the lithium-absorbing material because the lithium-absorbing materials pointed out above produce a prominent effect of decreasing the initial charge-discharge efficiency of the negative electrode when the lithium-absorbing material is used in combination with any of the negative electrode active materials described previously.

It is possible for the oxides pointed out above each of which is used as the lithium-absorbing material to contain Li or not to contain Li. The oxide not containing Li exhibits an Li absorption amount larger than that of the oxide containing Li. Therefore, if the negative electrode is manufactured by using the oxide not containing Li as the lithium-absorbing material, it is possible to promote the effect of decreasing the initial charge-discharge efficiency of the negative electrode. Materials containing Li and not containing Li will now be described with manganese based oxides taken up as an example.

Specifically, (i) the manganese based oxides not containing Li include, for example, $MnO_2$, and (ii) the manganese based oxides containing Li include, for example, $Li_xMnO_2$ ($0 < x \leq 3$). Incidentally, if $MnO_2$ absorbs Li, the resultant material can be represented by the compositional formula of $Li_xMnO_2$. In other words, the manganese based oxides exemplified in items (i) and (ii) given above can be represented by $Li_xMnO_2$ ($0 \leq x \leq 3$). This is also the case with other oxides.

For example, the manganese based oxides include, for example, $Li_{4+x}Mn_5O_{12}$ ($0 \leq x \leq 3$) in addition to $Li_xMnO_2$ ($0 \leq x \leq 3$). The niobium based oxides include, for example, $Li_xNb_2O_5$ ($0 \leq x \leq 3$) and $Li_xNbO_3$ ($0 \leq x \leq 3$). The molybdenum based oxides include, for example, $Li_xMoO_3$ ($0 \leq x \leq 3$). The copper based oxides include, for example, $Li_xCuO$ ($0 \leq x \leq 3$). The vanadium based oxides include, for example, $L_xV_2O_5$ ($0 \leq x \leq 3$) Further, the titanium based oxides includes, for example, $TiO_2$. These lithium-absorbing materials can be used singly or in the form of a mixture of at least two kinds of the oxides exemplified above.

The various compounds exemplified above exhibit the specific values of the Li absorption potential as given below. Concerning the Li absorption potential, it is possible to refer to, for example, "Updated Battery Handbook, translated by Tsutomu Takamura, published by Asakura Shoten (1996), FIG. 36.2 on page 610 and FIG. 2.2 on page 802".

$Li_{4+x}Ti_5O_{12}$: 1.50-1.55 V (vs. Li/Li$^+$)
$Li_xMnO_2$: 2.7-3.0 V (vs. Li/Li$^+$)
$Li_xNb_2O_5$: 1-2 V (vs. Li/Li$^+$)
$Li_xNbO_3$: 1-2 V (vs. Li/Li$^+$)
$Li_xMoO_3$: 2-3 V (vs. Li/Li$^+$)
$Li_xV_2O_5$: 3.2-3.5 V (vs. Li/Li$^+$)
$Li_xV_6O_{13}$: 2.2-3.3 V (vs. Li/Li$^+$)
$Li_xCuO$: 1.8-2.4 V (vs. Li/Li$^+$)

If a material that may possibly absorb Li at a potential close to or lower than the Li absorption potential of the negative electrode active material is used as the lithium-absorbing material, the Li absorption-release of the negative electrode active material is likely to be inhibited by the change in volume of the lithium-absorbing material accompanying the Li absorption-release. Therefore, in the case of using $Li_xNb_2O_5$ or $Li_xNbO_3$ as the lithium-absorbing material, it is desirable to decrease the content of the lithium-absorbing material so as to maintain the reversibility of the charge-discharge, i.e., to maintain a good charge-discharge cycle performance.

It is desirable for the Li absorption potential of the lithium-absorbing material to be nobler than or equal to 1.8 V (vs. Li/Li$^+$), preferably nobler than or equal to 2.0 V (vs. Li/Li$^+$), and more preferably nobler than or equal to 2.5 V (vs Li/Li$^+$). It is desirable to use the manganese based oxide as the lithium-absorbing material because the Li absorption potential of the manganese based oxide is 2.0 V (vs. Li/Li$^+$) or more. Particularly, it is desirable to use Li$_x$MnO$_2$ (0≦x≦3) as the lithium-absorbing material. Since an excellent effect can be obtained even if Li$_x$MnO$_2$ is added in a small amount, it is possible to obtain both a high capacity and excellent charge-discharge cycle characteristics of the secondary battery. In the case of using MnO$_2$ as the manganese based oxide, it is desirable for MnO$_2$ to have a β-type or γ-type crystal structure because MnO$_2$ having a β-type or γ-type crystal structure is excellent in the Li absorption capability.

In the case of using TiO$_2$ as the lithium-absorbing material, it is desirable to use Li$_{4+x}$Ti$_5$O$_{12}$ having the spinel structure as the negative electrode active material. It is possible to use TiO$_2$ having the anatase or rutile structure. TiO$_2$ having any of these crystal structures absorbs Li at a potential of about 2 V (vs. Li/Li$^+$). In view of the structural stability of TiO$_2$ itself in the stage of the Li absorption, it is desirable to use TiO$_2$ having the anatase structure.

Among the embodiments described above, it is most desirable for the negative electrode to contain a lithium-titanium oxide having the spinel structure as the lithium-titanium composite oxide and MnO$_2$ having the γ-type structure as the lithium-absorbing material, such that the weight ratio (A/B) falls within a range of 3 to 50. Incidentally, A denotes the weight (parts by weight) of the lithium-titanium composite oxide and B denotes the weight (parts by weight) of the lithium-absorbing material.

It is desirable for the porosity of the negative electrode excluding the current collector to fall within not lower than 20% to not higher than 50%. In this case, it is possible to obtain the negative electrode excellent in affinity between the negative electrode and the nonaqueous electrolyte and having a high density. It is more desirable for the negative electrode excluding the current collector to have a porosity falling within not lower than 25% to not higher than 40%.

It is desirable for the negative electrode current collector to be formed of an aluminum foil or an aluminum alloy foil. It is desirable for the negative electrode current collector to have an average crystal grain size not larger than 50 μm. In this case, it is possible to increase markedly the mechanical strength of the current collector. If the negative electrode current collector has a high mechanical strength, the negative electrode can be pressed under a high pressure so as to increase the density of the negative electrode and, thus, to increase the battery capacity. It is also possible to prevent the dissolution and deterioration by corrosion of the negative electrode current collector during the over-discharge cycle under a high temperature environment (not lower than 40° C.). As a result, the increase in the negative electrode impedance can be suppressed. Further, it is possible to improve the output characteristics, the fast charge characteristics and the charge-discharge cycle characteristics of the secondary battery. It is more desirable for the negative electrode current collector to have an average crystal grain size not larger than 30 μm, furthermore desirably not larger than 5 μm.

The average crystal grain size is obtained as follows. In the first step, the texture on the surface of the current collector is observed with an optical microscope so as to count the number n of the crystal grains present within a unit area of 1 mm×1 mm. Then, the average crystal grain size area S is obtained by using the number n thus obtained by the formula: S=1×10$^6$/n (μm$^2$). Further, the average crystal grain size d (μm) is calculated by formula (2) given below by using the area S thus obtained:

$$d=2(S/\pi)^{1/2} \quad (2)$$

The average crystal grain size is affected in a complex manner by a plurality of factors such as the material texture, the impurities, the process conditions, the history of the heat treatments, and the annealing conditions. An aluminum foil or an aluminum alloy foil having the average crystal grain size not larger than 50 μm can be obtained by controlling the crystal grain sizes by the combination of the factors pointed out above during the manufacturing process.

It is desirable for the aluminum foil or the aluminum alloy foil to have a thickness not larger than 20 μm, more desirably not larger than 15 μm. It is desirable for the aluminum foil to have a purity not lower than 99%. It is desirable for the aluminum alloy to contain an alloying element such as magnesium, zinc, or silicon. On the other hand, it is desirable for the amount of the transition metal such as iron, copper, nickel or chromium, which is contained in the aluminum alloy, to be not larger than 1%.

It is possible to use, for example, a carbon material as the electronic conductor contained in the negative electrode. The carbon material that can be used as the electronic conductor includes, for example, acetylene black, carbon black, coke, a carbon fiber and graphite. It is also possible to use, for example, a metal powder such as an aluminum powder or a conductive ceramic material such as TiO as the electronic conductor. Particularly, it is desirable for the electronic conductor to be formed of coke subjected to a heat treatment at 800 to 2,000° C. and having an average particle size not larger than 10 μm, graphite, a TiO power, and a carbon fiber having an average particle size not larger than 1 μm. It is desirable for the carbon material to have not smaller than 10 m$^2$/g of the BET specific surface area determined by the N$_2$ adsorption.

The binder used in the negative electrode includes, for example, polytetrafluoro ethylene (PTFE), polyvinylidene fluoride (PVdF), a fluorinated rubber, styrene-butadiene rubber, and a core shell binder.

Concerning the mixing ratio of the negative electrode active material, the negative electrode electronic conductor and the binder, it is desirable for the negative electrode active material to be used in an amount of not smaller than 70% to not larger than 96% by weight, for the negative electrode electronic conductor to be used in an amount of not smaller than 2% to not larger than 28% by weight, and for the binder to be used in an amount of not smaller than 2% to not larger than 28% by weight. If the amount of the negative electrode electronic conductor is not smaller than 2% by weight, it is possible to improve the current collecting capability of the negative electrode active material-containing layer so as to further improve the large current characteristics of the non-aqueous electrolyte secondary battery. Also, if the amount of the binder is not smaller than 2% by weight, it is possible to improve the bonding strength between the negative electrode active material-containing layer and the negative electrode current collector so as to improve the charge-discharge cycle characteristics of the secondary battery. On the other hand, it is desirable for the amount of each of the negative electrode electronic conductor and the binder to be not larger than 28% in view of improving the capacity of the secondary battery.

The negative electrode can be manufactured, for example, as follows.

In the first step, a slurry is prepared by suspending the negative electrode active material, the negative electrode electronic conductor, and the binder in a general purpose solvent. Then, the negative electrode current collector is coated with the slurry thus prepared, followed by drying the coated slurry so as to form a negative electrode active material-containing layer and subsequently pressing the negative electrode current collector having the negative electrode active material-containing layer formed thereon.

The general atomic absorption spectrophotometry can be employed for measuring the amount of Li contained in $Li_xMnO_2$, etc., under the charged state of the secondary battery. On the other hand, the weight A of the lithium-titanium composite oxide and the weight B of the lithium-absorbing material denotes the weight under the discharged state of the secondary battery. The weights A and B can be measured by removing the electronic conductor and the binder from the negative electrode by means of, for example, a heat treatment, followed by classifying the resultant mixture into the lithium-titanium composite oxide and the lithium-absorbing material. Alternatively, the weight ratio (A/B) of the weights A and B can be obtained, for example, as follows. In the first step, the substance (compound) contained in the negative electrode is identified by the XRD measurement. Then, the weight ratio of the main elements of the phase constituting the mixture containing the identified substance (compound), e.g., the weight ratio of Ti to Mn, is measured by the atomic absorption spectrophotometry. Further, the weight ratio thus obtained is converted into the weight ratio of the compound, thereby obtaining the weight ratio (A/B) of the weights A and B.

The substances contained in the electrode can be identified by the general XRD analysis. Concerning the known substance, the substance (constituting phase) can be identified by applying the XRD measurement, followed by checking the resultant pattern with a Joint Committee on Powder Diffraction Standards (JCPDS) card. Concerning the unknown substance, the substance (constituting phase) can be identified by the technology described in "New Edition, Summary of Cullity X-ray diffraction, translated by Gentaro Matsumura, published by Agne Shofu-sha Inc. Chapter 10". The substance can be identified more in detail if the composition analysis such as the ICP-AES (Inductively Coupled Plasma-Atomic Emission Spectroscopy) analysis is also used together.

2) Nonaqueous Electrolyte

The nonaqueous electrolyte used in the embodiment of the present invention includes a liquid nonaqueous electrolyte, a gel nonaqueous electrolyte, a room temperature molten salt-containing nonaqueous electrolyte and a solid electrolyte. The liquid nonaqueous electrolyte can be prepared by dissolving an electrolyte in a nonaqueous solvent. On the other hand, the gel nonaqueous electrolyte can be prepared by forming a composite material by mixing a liquid nonaqueous electrolyte with a polymer material.

It is desirable for the nonaqueous electrolyte to contain a room temperature molten salt consisting of a incombustible ionic liquid that is not volatile.

The electrolyte used in the embodiment of the present invention includes, for example, a lithium salt such as lithium perchlorate ($LiClO_4$), lithium hexafluoro phosphate ($LiPF_6$), lithium tetrafluoro borate ($LiBF_4$), lithium hexafluoro arsenate ($LiAsF_6$), lithium trifluoro metasulfonate ($LiCF_3SO_3$), or bistrifluoromethyl sulfonylimide lithium [$LiN(CF_3SO_2)_2$]. It is possible to use a single kind of the electrolyte or a plurality of different kinds of the electrolytes exemplified above simultaneously in combination. It is desirable for the electrolyte not to be oxidized even under a high potential. It is most desirable to use $LiPF_6$ as the electrolyte.

The organic solvent noted above includes, for example, cyclic carbonates such as propylene carbonate (PC), ethylene carbonate (EC), and vinylene carbonate; linear carbonates such as diethyl carbonate (DEC), dimethyl carbonate (DMC), and methyl ethyl carbonate (MEC); cyclic ethers such as tetrahydrofuran (THF), 2-methyl tetrahydrofuran (2MeTHF), and dioxolane (DOX); linear ethers such as dimethoxy ethane (DME), and diethoxy ethane (DEE); as well as γ-butyrolactone (GBL), acetonitrile (AN), and sulfolane (SL). These organic solvents can be used singly or in the form of a mixture of a plurality of the organic solvents exemplified above.

The polymer material used in the embodiment of the present invention includes, for example, polyvinylidene fluoride (PVdF), polyacrylonitrile (PAN), and polyethylene oxide (PEO).

It is desirable to use a mixed solvent prepared by mixing at least two solvents selected from the group consisting of propylene carbonate (PC), ethylene carbonate (EC) and γ-butyrolactone (GBL), as the organic solvent. It is more desirable to use γ-butyrolactone (GBL) as the organic solvent.

It should be noted in this connection that γ-butyrolactone, propylene carbonate and ethylene carbonate have a high boiling point and a high ignition point and, thus, are thermally stable.

It should also be noted that the lithium-titanium composite oxide absorbs and releases lithium ions under the potential region in the vicinity of 1.5 V (vs. $Li/Li^+$). However, the reducing reaction of the nonaqueous electrolyte is unlikely to be generated under the potential region noted above, with the result that a film, which is formed of the reduction product of the nonaqueous electrolyte, is unlikely to be formed on the surface of the lithium-titanium composite oxide. Therefore, if the secondary battery is stored under the state of absorbing lithium, i.e., under a charged state, the lithium ions absorbed in the lithium-titanium composite oxide are gradually diffused into the liquid electrolyte, thereby bringing about the so-called "self-discharge". The self-discharge is rendered prominent with increase in the temperature of the storing environment for the battery.

It should be noted that γ-butyrolactone is likely to be reduced, compared with the linear carbonate and the cyclic carbonate. To be more specific, the organic solvents are likely to be reduced in the order of γ-butyrolactone>>>ethylene carbonate>propylene carbonate>>dimethyl carbonate>methyl ethyl carbonate>diethyl carbonate. The degree of difference in the reactivity among the solvents is denoted by the number of signs of inequality (>) given above.

Therefore, if γ-butyrolactone is contained in the liquid electrolyte, a satisfactory film can be formed on the surface of the lithium-titanium composite oxide even under the operating potential region of the lithium-titanium composite oxide. As a result, it is possible to suppress the self-discharge so as to improve the high temperature storage characteristics of the nonaqueous electrolyte battery.

This is also the case with the mixed solvent referred to above.

The use of a room temperature molten salt that tends to be reduced easily also produces the similar effect. In addition, the room temperature molten salt also tends to be oxidized easily. In this case, the room temperature molten salt also act on the positive electrode so as to produce the effect of suppressing the self-discharge and improving the charge-discharge cycle life of the secondary battery.

In order to form a more satisfactory protective film, it is desirable for the mixed solvent to contain not smaller than 40% to not larger than 95% by volume of γ-butyrolactone.

The liquid nonaqueous electrolyte can be prepared, for example, by dissolving the electrolyte in the organic solvent in a concentration of not lower than 0.5 mol/L to not higher than 2.5 mol/L.

The room temperature molten salt-containing nonaqueous electrolyte will now be described.

The room temperature molten salt denotes a salt that exhibits a liquid state at least partially under room temperature. The room temperature denotes the temperature range within which the power source is assumed to operate in general. The temperature range within which the power source is assumed to operate in general has an upper limit of about 120° C. or about 60° C. depending on the situation and a lower limit of about −40° C. or about −20° C. depending on the situation. Particularly, it is desirable for a temperature range within which the power source is assumed to operate in general to denote the temperature within not lower than −20° C. to not higher than 60° C.

It is desirable to use an ionic melt consisting of a lithium ion, an organic cation and an anion as the room temperature molten salt containing lithium ions. It is desirable for the ionic melt to be in the form of a liquid even under temperatures not higher than room temperature.

The organic cation contained in the ionic melt includes the alkyl imidazolium ion or the quaternary ammonium ion having the skeletal structure represented by chemical formula (1) given below:

chemical formula (1)

It is desirable for the alkyl imidazolium ion noted above to be provided by a dialkyl imidazolium ion, a trialkyl imidazolium ion or a tetraalkyl imidazolium ion. It is desirable for the dialkyl imidazolium ion to be provided by a 1-methyl-3-ethyl imidazolium ion (MEI$^+$). It is desirable for the trialkyl imidazolium ion to be provided by a 1,2-diethyl-3-propyl imidazolium ion (DMPI$^+$). Further, it is desirable for the tetraalkyl imidazolium ion to be provided by a 1,2-diethyl-3,4 (5)-dimethyl imidazolium ion.

On the other hand, it is desirable for the quaternary ammonium ion noted above to be provided by a tetraalkyl ammonium ion or a cyclic ammonium ion. It is desirable for the tetraalkyl ammonium ions to be provided by a dimethyl ethyl methoxy ammonium ion, a dimethyl ethyl methoxy methyl ammonium ion, a dimethyl ethyl ethoxy ethyl ammonium ion and a trimethyl propyl ammonium ion.

By using the alkyl imidazolium ion or the quaternary ammonium ion noted above, particularly, tetraalkyl ammonium ion, it is possible to lower the melting point of the room temperature molten salt to 100° C. or lower, more preferably to 20° C. or lower. Further, the reactivity of the room temperature molten salt with the negative electrode can be lowered.

It is desirable for the lithium ion concentration in the room temperature molten salt to be set at 20 mol % or less, more preferably to fall within not lower than 1 mol % to not higher than 10 mol %. If the lithium ion concentration is set to fall within the range given above, it is possible to form easily the room temperature molten salt that is in the form of a liquid under low temperatures not higher than 20° C. It is also possible to lower the viscosity of the room temperature molten salt under temperatures not higher than room temperature so as to improve the ionic conductivity.

The anion noted above includes, for example, $BF_4^-$, $PF_6^-$, $AsF_6^-$, $ClO_4^-$, $CF_3SO_3^-$, $CF_3COO^-$, $CH_3COO^-$, $CO_3^{2-}$, $N(CF_3SO_2)_2^-$, $N(C_2F_5SO_2)_2^-$, and $(CF_3SO_2)_3C^-$. It is desirable for at least two kinds of these anions to be present together. If a plurality of anions are present together, it is possible to form easily a room temperature molten salt having a melting point not higher than 20° C. More preferably, it is possible to form a room temperature molten salt having a melting point not higher than 0° C. More preferred anions include $BF_4^-$, $CF_3SO_3^-$, $CF_3COO^-$, $CH_3COO^-$, $CO_3^{2-}$, $N(CF_3SO_2)_2^-$, $N(C_2F_5SO_2)_2^-$, and $(CF_3SO_2)_3C^-$. These anions make it possible to form easily a room temperature molten salt having a melting point not higher than 0° C.

3) Positive Electrode

The positive electrode comprises a positive electrode current collector and a positive electrode active material-containing layer or layers formed on one surface or both surface of the positive electrode current collector. The positive electrode active material-containing layer contains a positive electrode active material, a positive electrode electronic conductor and a binder.

The positive electrode active material includes, for example, an oxide, a sulfide and a polymer.

The oxide noted above includes, for example, an oxide absorbing Li such as manganese dioxide ($MnO_2$), iron oxide, copper oxide, and nickel oxide, a lithium-manganese composite oxide (e.g., $Li_xMn_2O_4$ or $Li_xMnO_2$), a lithium-cobalt composite oxide ($Li_xCoO_2$), a lithium-manganese-cobalt composite oxide (e.g., $LiMn_yCo_{1-y}O_2$), a lithium-phosphorus composite oxide having the olivine structure (e.g., $Li_xFePO_4$, $Li_xFe_{1-y}Mn_yPO_4$, $Li_xVPO_4F$, and $Li_xCoPO_4$), iron sulfate ($Fe_2(SO_4)_3$), and vanadium oxide (e.g., $V_2O_5$). Also, it is possible to use a lithium-nickel containing composite oxide as the positive electrode active material. The lithium-nickel containing composite oxide denotes an oxide containing lithium and nickel. The lithium-nickel containing composite oxide, which is used in the embodiment of the present invention, includes, for example, a lithium-nickel composite oxide such as $Li_xNiO_2$, a lithium-nickel-cobalt composite oxide such as $LiNi_{1-y}Co_yO_2$, a lithium-manganese-nickel composite oxide having the spinel structure such as $Li_xMn_{2-y}Ni_yO_4$, and a lithium-nickel-cobalt-manganese composite oxide.

The polymer used in the embodiment of the present invention includes, for example, a conductive polymer material such as polyaniline and polypyrrole and a disulfide based polymer material. It is also possible to use sulfur (S), a fluorocarbon etc. as the positive electrode active material.

The positive electrode active material that permits obtaining a high positive electrode potential includes, for example, a lithium-manganese composite oxide ($Li_xMn_2O_4$), a lithium-nickel composite oxide ($Li_xNiO_2$), a lithium-cobalt composite oxide ($Li_xCoO_2$), a lithium-nickel-cobalt composite oxide ($Li_xNi_{1-y}Co_yO_2$), a lithium-manganese-nickel composite oxide having the spinel structure ($Li_xMn_{2-y}Ni_yO_4$), a lithium-manganese-cobalt composite oxide ($Li_xMn_yCo_{1-y}O_2$), lithium iron phosphate ($Li_xFePO_4$), and a lithium-nickel-cobalt-manganese composite oxide. Incidentally, it is desirable for each of the molar ratios x and y in the chemical formulas given above to fall within a range of 0 to 1.

The lithium-nickel-cobalt-manganese composite oxide noted above includes $Li_aNi_bCo_cMn_dO_2$ where the molar ratios a, b, c and d are: $0 \leq a \leq 1.1$; $0.1 \leq b \leq 0.5$; $0 \leq c \leq 0.9$; and $0.1 \leq d \leq 0.5$.

It is desirable to use a lithium-nickel containing composite oxide as the positive electrode active material. The lithium-nickel containing composite oxide has a relatively low initial charge-discharge efficiency. Therefore, if the lithium-nickel containing composite oxide is used in combination with the negative electrode described previously, the effect of improving the charge-discharge cycle characteristics of the secondary battery can be produced particularly prominently. Similarly, among the lithium-nickel containing composite oxides, it is particularly desirable to use a composite oxide represented by the compositional formula $Li_aNi_bCo_cMn_dO_2$ where the molar ratios a, b, c and d are: $0 \leq a \leq 1.1$; $0.1 \leq b \leq 0.5$; $0 \leq c \leq 0.9$; and $0.1 \leq d \leq 0.5$.

Further, the battery voltage can be increased by using a positive electrode containing a lithium-manganese-nickel composite material having the spinel structure as the positive electrode active material in combination with the negative electrode described previously. Alternatively, it is possible to realize a nonaqueous electrolyte battery excellent in the thermal stability by allowing the positive electrode active material to contain a lithium-phosphorus composite oxide having the olivine structure such as $Li_xFePO_4$, $Li_xFe_{1-x}Mn_yPO_4$, $Li_xVPO_4F$, or $Li_xCoPO_4$ ($0 \leq x \leq 1$, $0 \leq y \leq 1$).

Particularly, in the case of using a nonaqueous electrolyte containing a room temperature molten salt, it is desirable in view of the charge-discharge cycle life of the secondary battery to use lithium iron phosphate, $Li_xVPO_4F$, a lithium-manganese composite oxide, a lithium-nickel composite oxide, or a lithium-nickel-cobalt composite oxide as the positive electrode active material because the reactivity of the positive electrode active material exemplified above with the room temperature molten salt is low.

Also, the positive electrode active material for the primary battery includes, for example, manganese dioxide, iron oxide, copper oxide, iron sulfide and fluorocarbon.

It is desirable for a primary particle of the positive electrode active material to have a particle size of not smaller than 100 nm to not larger than 1 μm. The primary particle of positive electrode active material having the particle size not smaller than 100 nm can be handled easily industrially. Also, if the particle size of the primary particle is not larger than 1 μm, it is possible for the lithium ions to be diffused smoothly within a solid material.

It is desirable for the positive electrode active material to have a specific surface area falling within not smaller than 0.1 $m^2/g$ to not larger than 10 $m^2/g$. If the specific surface area is not smaller than 0.1 $m^2/g$, it is possible to secure sufficiently the absorption-release site of the lithium ions. Also, if the specific surface area is not larger than 10 $m^2/g$, the positive electrode active material can be handled easily industrially and it is possible to secure a good charge-discharge cycle performance of the secondary battery.

The positive electrode electronic conductor that permits enhancing the current collecting capability and also permits suppressing the contact resistance with the current collector includes, for example, a carbonaceous material such as acetylene black, carbon black and graphite.

The binder for binding the positive electrode active material and the positive electrode electronic conductor includes, for example, polytetrafluoro ethylene (PTFE), polyvinylidene fluoride (PVdF) and a fluorinated rubber.

Concerning the mixing ratio of the positive electrode active material, the positive electrode electronic conductor and the binder, it is desirable for the positive electrode active material to be used in an amount of not smaller than 80% to not larger than 95% by weight, for the positive electrode electronic conductor to be used in an amount of not smaller than 3% to not larger than 18% by weight and for the binder to be used in an amount of not smaller than 2% to not larger than 17% by weight. If the positive electrode electronic conductor is used in an amount not smaller than 3% by weight, it is possible to obtain the effect described above. Also, if the mixing amount of the positive electrode electronic conductor is not larger than 18%, it is possible to suppress the decomposition of the nonaqueous electrolyte on the surface of the positive electrode electronic conductor during storage of the secondary battery under a high temperature. Also, if the mixing amount of the binder is not smaller than 2% by weight, it is possible to obtain a sufficient electrode strength. Also, if the mixing amount of the binder is not larger than 17%, the mixing amount of an insulator in the electrode can be decreased so as to decrease the internal resistance of the secondary battery.

It is desirable for the positive electrode current collector to be formed of an aluminum foil or an aluminum alloy foil. Like the negative electrode current collector, it is desirable for the positive electrode current collector to have an average crystal grain size not larger than 50 μm, more desirably not larger than 30 μm, and most desirably not larger than 5 μm. If the average crystal grain size is not larger than 50 μm, it is possible to increase markedly the mechanical strength of the aluminum foil or the aluminum alloy foil. Therefore, the positive electrode can be pressed under a high pressure so as to increase the density of the positive electrode and, thus, to increase the battery capacity.

The average crystal grain size is affected in a complex manner by a plurality of factors such as the material texture, the impurities, the process conditions, the history of the heat treatments, and the annealing conditions. An aluminum foil or an aluminum alloy foil having the average crystal grain size not larger than 50 μm can be obtained by controlling the crystal grain sizes by the combination of the factors pointed out above during the manufacturing process.

It is desirable for the aluminum foil or the aluminum alloy foil to have a thickness not larger than 20 μm, more desirably not larger than 15 μm. Also, it is desirable for the aluminum foil to have a purity not lower than 99%. It is desirable for the aluminum alloy to contain an alloying element such as magnesium, zinc, or silicon. On the other hand, it is desirable for the amount of the transition metal such as iron, copper, nickel or chromium, which is contained in the aluminum alloy, to be not larger than 1%.

The positive electrode can be manufactured, for example, as follows.

In the first step, a slurry is prepared by suspending the positive electrode active material, the positive electrode electronic conductor, and the binder in a suitable solvent. Then, the positive electrode current collector is coated with the slurry thus prepared, followed by drying the coated slurry so as to form a positive electrode active material-containing layer and subsequently pressing the positive electrode current collector having the positive electrode active material-containing layer formed thereon. Alternatively, it is also possible to mold a mixture containing the positive electrode active material, the positive electrode electronic conductor, and the binder into pellets so as to form the positive electrode active material-containing layer.

4) Separator

The separator used in the embodiment of the present invention includes, for example, a porous film containing polyethylene, polypropylene, cellulose or polyvinylidene fluoride (PVdF), and an unwoven fabric made of synthetic resin. Particularly, in view of improving the safety, it is desirable to use a porous film made of polyethylene or polypropylene as the separator because the porous film made of polyethylene or polypropylene can be melted under a given temperature so as to cut off the electric current.

5) Case

The case used in the embodiment of the present invention includes, for example, a laminate film having a thickness not larger than 0.2 mm and a metal sheet having a thickness not larger than 0.5 mm. It is more desirable for the metal sheet to have a thickness not larger than 0.2 mm.

The shape of the case includes, for example, a flat type, an rectangular type, a cylindrical type, a coin type, a button type, a sheet type and a lamination type. Incidentally, it is of course possible for the nonaqueous electrolyte secondary battery of the embodiment of the present invention to be a large battery that is mounted on, for example, a vehicle having two to four wheels in addition to a small battery that is mounted on, for example, a portable electronic apparatus.

The laminate film noted above denotes a multi-layered film comprising a metal layer and a resin layer covering the metal layer. For decreasing the weight, it is desirable for the metal layer included in the laminate film to be formed of an aluminum foil or an aluminum alloy foil. The resin layer serves to reinforce the metal layer. The resin layer covering the metal layer can be formed of a polymer such as polypropylene (PP), polyethylene (PE), nylon, or polyethylene terephthalate (PET). The laminate film can be formed into the case by sealing the peripheral regions of the laminate film by employing the heat seal.

The metal sheet used for preparing the case includes, for example, an aluminum sheet and an aluminum alloy sheet. It is desirable for the aluminum alloy used for forming the case to contain an alloying element such as magnesium, zinc or silicon. On the other hand, it is desirable for the amount of the transition metal such as iron, copper, nickel or chromium, which are contained in the aluminum alloy, to be not larger than 1%. In this case, it is possible to improve markedly the reliability over a long period and the heat radiative properties under a high temperature environment.

It is desirable for the metal can formed of an aluminum sheet or an aluminum alloy sheet to have an average crystal grain size not larger than 50 μm, more desirably not larger than 30 μm, and furthermore desirably not larger than 5 μm. If the average crystal grain size noted above is not larger than 50 μm, it is possible to increase markedly the mechanical strength of the metal can formed of the aluminum sheet or the aluminum alloy sheet so as to make it possible to decrease the thickness of the metal can. As a result, it is possible to realize a secondary battery light in weight, having a high output, excellent in the reliability over a long period and adapted for the mounting on a vehicle.

6) Negative Electrode Terminal

The negative electrode terminal is formed of a material having an electric stability and an electric conductivity within not lower than 0.3 V (vs. Li/Li$^+$) to not higher than 3 V (vs. Li/Li$^+$) in the potential relative to the lithium metal. To be more specific, the material of the negative electrode terminal includes, for example, aluminum or an aluminum alloy containing an alloying element such as Mg, Ti, Zn, Mn, Fe, Cu, or Si. In order to decrease the contact resistance, it is desirable for the material of the negative electrode terminal to be same with the material of the negative electrode current collector.

7) Positive Electrode Terminal

The positive electrode terminal is formed of a material having an electric stability and an electric conductivity within not lower than 3 V (vs. Li/Li$^+$) to not higher than 5 V (vs. Li/Li$^+$) in the potential relative to the lithium metal. To be more specific, the material of the positive electrode terminal includes, for example, aluminum or an aluminum alloy containing an alloying element such as Mg, Ti, Zn, Mn, Fe, Cu, or Si. In order to decrease the contact resistance, it is desirable for the material of the positive electrode terminal to be same with the material of the positive electrode current collector.

The construction of the nonaqueous electrolyte battery according to this embodiment of the present invention is not limited to that shown in FIGS. 1 and 2. For example, it is possible for the nonaqueous electrolyte battery of the embodiment of the present invention to be constructed as shown in FIGS. 3 and 4, wherein FIG. 3 is an oblique view, partly broken away, schematically showing the construction of another flat type nonaqueous electrolyte secondary battery according to the embodiment of the present invention, and FIG. 4 is a cross sectional view showing in a magnified fashion the construction in the circular portion B shown in FIG. 3 of the nonaqueous electrolyte secondary battery.

Figure 3:
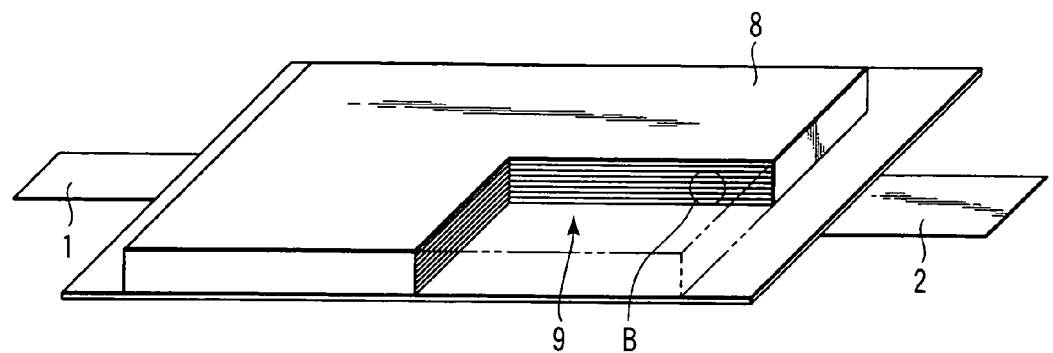
FIG. 3 is an oblique view, partly broken away, schematically showing the construction of another flat type nonaqueous electrolyte secondary battery according to one embodiment of the present invention.
Figure 4:
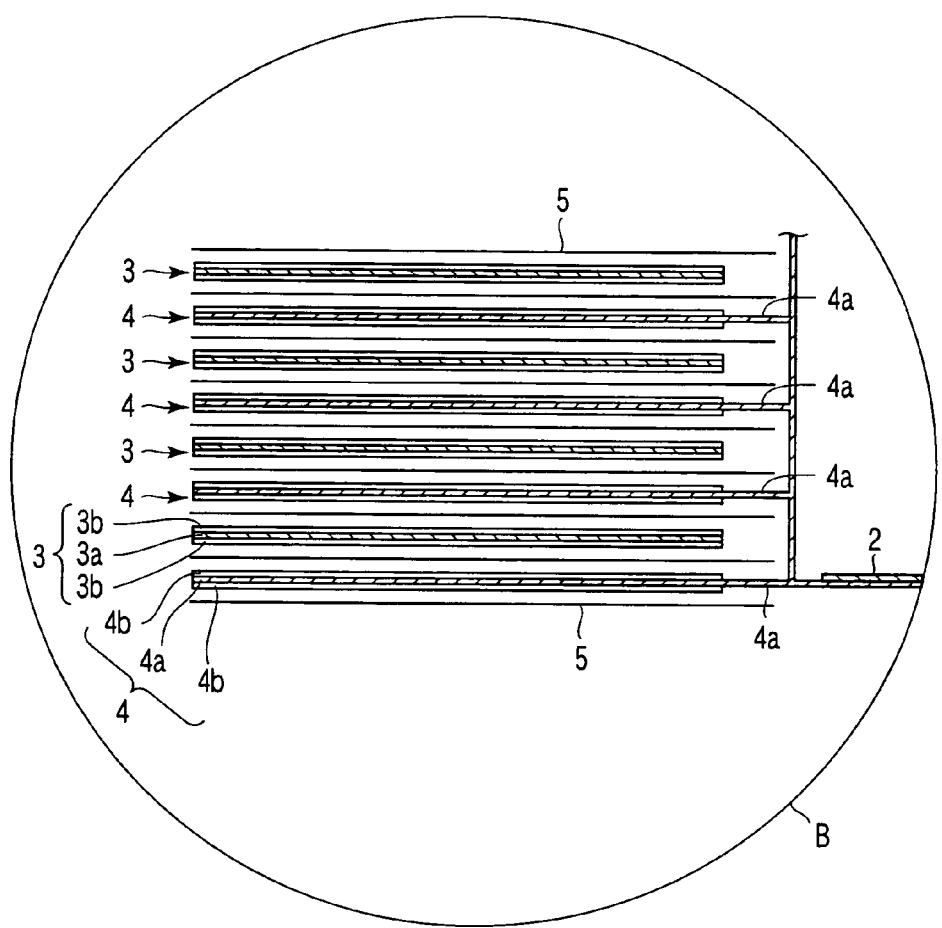
FIG. 4 is a cross-sectional view showing in a magnified fashion the construction in the circular region B shown in FIG. 3 of the nonaqueous electrolyte secondary battery.

As shown in FIG. 3, a laminate type electrode group 9 is housed in a case 8 formed of a laminate film. As shown in FIG. 4, the laminate type electrode group 9 comprises a positive electrode 3 and a negative electrode 4, which are laminated one upon the other with a separator 5 interposed between the positive electrode 3 and the negative electrode 4. Each of a plurality of positive electrodes 3 includes a positive electrode current collector 3a and positive electrode active material-containing layers 3b formed on both surfaces of the positive electrode current collector 3a. Likewise, each of a plurality of negative electrodes 4 includes a negative electrode current collector 4a and negative electrode active material-containing layers 4b formed on both surfaces of the negative electrode current collector 4a. One side of the negative electrode current collector 4a included in each negative electrode 4 protrudes from the positive electrode 3. The negative electrode current collector 4a protruding from the positive electrode 3 is electrically connected to a band-like negative electrode terminal 2. The distal end portion of the band-like negative electrode terminal 2 is withdrawn from the case 8 to the outside. Also, one side of the positive electrode current collector 3a included in the positive electrode 3, which is positioned on the side opposite to the protruding side of the negative electrode current collector 4a, is protruded from the negative electrode 4, though the particular construction is not shown in the drawing. The positive electrode current collector 3a protruding from the negative electrode 4 is electrically connected to a band-like positive electrode terminal 1. The distal end portion of the band-like positive electrode terminal 1 is positioned on the side opposite to the side of the negative electrode terminal 2 and is withdrawn from the side of the case 8 to the outside.

A battery pack according to a second embodiment of the present invention comprises a plurality of unit cells formed of the nonaqueous electrolyte batteries according to the first embodiment of the present invention described above. The unit cells are electrically connected to each other in series or in parallel so as to form a battery module.

The unit cell, or the nonaqueous electrolyte battery, according to the first embodiment of the present invention is adapted for preparation of the battery module, and the battery pack according to the second embodiment of the present invention is excellent in the charge-discharge cycle characteristics. It is possible to use the flat type secondary battery constructed as shown in FIG. 1 or FIG. 3 as the unit cell.

Figure 6:
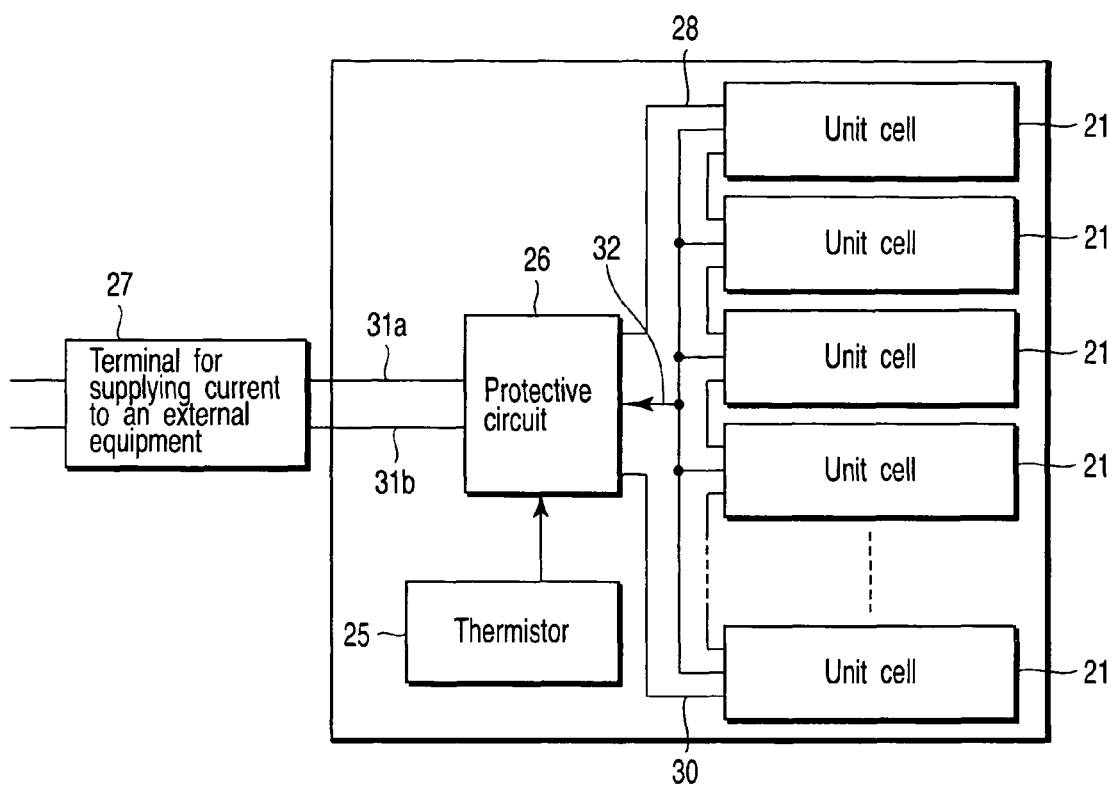
FIG. 6 is a block diagram showing the electric circuit of the battery pack shown in FIG. 5.

A unit cell 21 included in the battery pack shown in FIG. 5 is formed of the flat type nonaqueous electrolyte battery constructed as shown in FIG. 1. A plurality of unit cells 21 are stacked one upon the other in the thickness direction in a manner to align the extruding direction of each of the positive electrode terminals 1 and the negative electrode terminals 2. As shown in FIG. 6, the unit cells 21 are connected to each other in series so as to form a battery module 22. The unit cells 21 forming the battery module 22 are arranged in unit by an adhesive tape 23, as shown in FIG. 5.

A printed wiring board 24 is arranged on the side region toward which protrude the positive electrode terminals 1 and the negative electrode terminals 2. As shown in FIG. 6, a thermistor 25, a protective circuit 26 and a terminal 27 for supplying current to an external equipment are mounted on the printed wiring board 24.

As shown in FIGS. 5 and 6, a wiring 28 on the side of the positive electrode of the battery module 22 is electrically connected to a connector 29 on the side of the positive electrode of the protective circuit 26 mounted on the printed wiring board 24. On the other hand, a wiring 30 on the side of the negative electrodes of the battery module 22 is electrically connected to a connector 31 on the side of the negative electrode of the protective circuit 26 mounted on the printed wiring board 24.

The thermistor 25 detects the temperature of the unit cell 21, and transmits the detection signal to the protective circuit 26. The protective circuit 26 is capable of breaking a wiring 31a on the positive side and a wiring 31b on the negative side, the wirings 31a and 31b being stretched between the protective circuit 26 and the terminal 27 for supplying current to an external equipment. These wirings 31a and 31b are broken by the protective circuit 26 under prescribed conditions including, for example, the conditions that the temperature detected by the thermistor 25 is higher than a prescribed temperature, and that the over-charge, the over-discharge and the over-current of the unit cell 21 have been detected. The detecting method is applied to the unit cells 21 or to the battery module 22. In the case of employing the detecting method to each of the unit cells 21, it is possible to detect the battery voltage, the positive electrode potential or the negative electrode potential. On the other hand, where the positive electrode potential or the negative electrode potential is detected, lithium electrodes used as reference electrodes are inserted into the unit cells 21.

In the case of FIG. 6, a wiring 32 is connected to each of the unit cells 21 for detecting the voltage, and the detection signal is transmitted through these wirings 32 to the protective circuit 26.

Further, in the case shown in FIG. 6, all the unit cells 21 included in the battery module 22 are detected in terms of the voltage. Although it is particularly desirable for the voltages of all the unit cells 21 of the battery module 22 to be detected, it may be sufficient to check the voltages of only some of the unit cells 21.

Protective sheets 33 each formed of rubber or resin are arranged on the three of the four sides of the battery module 22, though the protective sheet 33 is not arranged on the side toward which protrude the positive electrode terminals 1 and the negative electrode terminals 2. A protective block 34 formed of rubber or resin is arranged in the clearance between the side surface of the battery module 22 and the printed wiring board 24.

The battery module 22 is housed in a container 35 together with each of the protective sheets 33, the protective block 34 and the printed wiring board 24. To be more specific, the protective sheets 33 are arranged inside the two long sides of the container 35 and inside one short side of the container 35. On the other hand, the printed wiring board 24 is arranged along that short side of the container 35 which is opposite to the short side along which one of the protective sheets 33 is arranged. The battery module 22 is positioned within the space surrounded by the three protective sheets 33 and the printed wiring board 24. Further, a lid 36 is mounted on close the upper open edge of the container 35.

Incidentally, it is possible to use a thermally shrinkable tube in place of the adhesive tape 23 for fixing the battery module 22. In this case, the protective sheets are arranged on both sides of the battery module 22 and, after the thermally shrinkable tube is wound about the battery module 22 with the protective sheets, the tube is thermally shrunk so as to fix the battery module 22.

The unit cells 21 shown in FIGS. 5 and 6 are connected in series. However, it is also possible to connect the unit cells 21 in parallel so as to increase the cell capacity. Of course, it is possible to connect the battery packs in series and in parallel.

Also, the construction of the battery pack can be changed appropriately depending on the use of the battery pack.

It is desirable for the battery pack to be used in the field requiring good charge-discharge cycle characteristics under a large current discharge because, in the case of a large current discharge, the problem relating to the regulation by the positive electrode described previously is brought about more prominently. To be more specific, the battery pack can be mounted on, for example, a power supply for a digital camera, and on vehicles such as a hybrid electric automobile having two to four wheels, an electric automobile having two to four wheels, and an assistant bicycle. Particularly, the battery pack is suitable for the mounting on a vehicle.

Incidentally, where the nonaqueous electrolyte contains a mixed solvent prepared by mixing at least two solvents selected from the group consisting of propylene carbonate (PC), ethylene carbonate (EC) and γ-butyrolactone (GBL), or where the nonaqueous electrolyte contains γ-butyrolactone (GBL), it is desirable for the battery pack to be used in the field requiring satisfactory high temperature characteristics. To be more specific, it is desirable for the battery pack to be mounted on the vehicle referred to above.

Described in the following are Examples of the present invention. Needless to say, the technical scope of the present invention is not limited by the following Examples as far as the subject matter of the present invention is not exceeded.

Example 1

Preparation of Positive Electrode

In the first step, a slurry was prepared by adding 90% by weight of a lithium-nickel-cobalt-manganese oxide ($LiNi_{1/3}Co_{1/3}Mn_{1/3}O_2$) powder used as a positive electrode active material, 5% by weight of acetylene black used as an electronic conductor, and 5% by weight of polyvinylidene fluoride (PVdF) used as a binder to N-methyl pyrrolidone (NMP). Then, both surfaces of a current collector formed of an aluminum foil having a thickness of 15 μm were coated with the slurry thus prepared, followed by drying and, then, pressing the current collector coated with the slurry so as to obtain a positive electrode having an electrode density of 3.3 g/cm³.

<Preparation of Negative Electrode>

Prepared was a lithium-titanium oxide ($Li_4Ti_5O_{12}$) powder having the spinel structure as a negative electrode active material. The lithium-titanium oxide powder had an average particle size of 0.82 μm, a BET specific surface area by the $N_2$ adsorption of 10.4 m²/g, and a Li absorption potential of 1.55 V (vs. Li/Li⁺). Also prepared as a lithium-absorbing material was a powder of $MnO_2$ having the γ-type structure (γ-$MnO_2$), which had an average particle size of 3.2 μm, a BET specific surface area by the $N_2$ adsorption of 1.2 m²/g and a Li absorption potential of 3.0 V (vs. Li/Li⁺).

Then, a slurry was prepared by adding 100 parts by weight of the negative electrode active material, 10 parts by weight of the lithium-absorbing material, 5 parts by weight of coke baked at 1,300° C. ($d_{002}$ of 0.3465 nm, average particle size of 8.2 μm, the BET specific surface area of 11.2 m²/g) which was used as an electronic conductor, and 5 parts by weight of polyvinylidene fluoride (PVdF) used as a binder to N-methyl pyrrolidone (NMP). Further, both surfaces of a current collector formed of an aluminum foil having a thickness of 15 μm (purity of 99.99% and average crystal grain size of 10 μm) were coated with the resultant slurry, followed by drying and, then, pressing the current collector coated with the slurry so as to obtain a negative electrode having an electrode density of 2.4 g/cm³.

<Construction of Initial Charge-Discharge Curve of Negative Electrode Relative to Lithium Metal>

A negative electrode piece sized at 2 cm×2 cm was cut out of the negative electrode manufactured as described above and used as a functional electrode. The functional electrode thus obtained and a counter electrode formed of a lithium metal foil sized at 2.2 cm×2.2 cm were arranged to face each other with a glass filter (separator) interposed therebetween. Also, a lithium metal was used as a reference electrode. These electrodes were put in a three-electrode type glass cell. The reference electrode was inserted so as not to be brought into contact with any of the functional electrode and the counter electrode. Each of the functional electrode, the counter electrode and the reference electrode was connected to the terminal of the glass cell. A liquid electrolyte in an amount of 25 mL was poured into the glass cell so as to permit the separator and the electrodes to be impregnated sufficiently with the liquid electrolyte and, then, the glass cell was hermetically closed. The liquid electrolyte was prepared by dissolving 1.5 mol/L of lithium tetrafluoro borate ($LiBF_4$) in a mixed solvent of ethylene carbonate (EC) and γ-butyrolactone (GBL), which were mixed at a volume ratio (EC:GBL) of 1:2. The hermetically closed glass cell was arranged in a thermostat bath maintained at 25° C. so as to measure the lithium ion absorption-release potential of the functional electrode when the functional electrode was charged and discharged at a current density of 0.1 mA/cm², thereby constructing a graph of the capacity-potential (vs. Li/Li⁺).

<Measurement of Li Absorption Potential of Lithium-Titanium Composite Oxide>

The Li absorption potential of the negative electrode active material was measured as follows.

In the first step, a slurry was prepared by adding 100 parts by weight of the negative electrode active material, 5 parts by weight of coke baked at 1,300° C. ($d_{002}$ of 0.3465 nm, average particle size of 8.2 μm, and BET specific surface area of 11.2 m²/g), which was used as an electronic conductor, and 5 parts by weight of polyvinylidene fluoride (PVdF) used as a binder to N-methyl pyrrolidone (NMP). Then, an electrode was prepared as described above, except that the slurry thus prepared was used for preparing the electrode. An electrode piece sized at 2 cm×2 cm was cut out of the electrode thus prepared so as to obtain a functional electrode. The functional electrode thus obtained was positioned to face a counter electrode formed of a lithium metal foil and sized at 2.2 cm×2.2 cm with a glass filter (separator) interposed therebetween. Also, a lithium metal was used as a reference electrode. These electrodes were put in a three-electrode type glass cell. The reference electrode was inserted so as not to be brought into contact with any of the functional electrode and the counter electrode. Each of the functional electrode, the counter electrode and the reference electrode was connected to the terminal of the glass cell. A liquid electrolyte in an amount of 25 mL was poured into the glass cell so as to permit the separator and the electrodes to be impregnated sufficiently with the liquid electrolyte and, then, the glass cell was hermetically closed. The liquid electrolyte was prepared by dissolving 1.5 mol/L of lithium tetrafluoro borate ($LiBF_4$) in a mixed solvent of ethylene carbonate (EC) and γ-butyrolactone (GBL), which were mixed at a volume ratio (EC:GBL) of 1:2. The hermetically closed glass cell was arranged in a thermostat bath maintained at 25° C. so as to measure the lithium ion absorption potential of the functional electrode when the functional electrode was charged with a current density of 0.01 mA/cm².

<Measurement of Li Absorption Potential of Lithium-Absorbing Material>

The lithium absorption potential of the lithium-absorbing material was measured as follows.

In the first step, a slurry was prepared by adding 100 parts by weight of the lithium-absorbing material, 5 parts by weight of coke baked at 1,300° C. ($d_{002}$ of 0.3465 nm, an average particle size of 8.2 μm, and a BET specific surface area of 11.2 m²/g), which was used as an electronic conductor, and 5 parts by weight of polyvinylidene fluoride (PVdF), which was used as a binder, to N-methyl pyrrolidone (NMP). Then, an electrode was prepared as above, except that the slurry thus prepared was used for preparing the electrode. Further, a glass cell was manufactured so as to measure the lithium ion absorption potential as above, except that the electrode thus prepared was used for manufacturing the glass cell.

<Preparation of Electrode Group>

The positive electrode, a separator formed of a porous polyethylene film having a thickness of 25 μm, the negative electrode and an additional separator were laminated one upon the other in the order mentioned, followed by spirally winding the resultant laminate structure. Further, the spirally wound laminate structure was pressed under heat at 90° C. so as to manufacture a flat electrode group having a width of 30 mm and a thickness of 3.0 mm. The electrode group thus obtained was housed in a pack and subjected to drying under vacuum at 80° C. for 24 hours. The pack used was formed of a laminate film consisting of an aluminum foil having a thickness of 40 μm and polypropylene layers formed on both surfaces of the aluminum foil, and having a thickness of 0.1 mm.

<Preparation of Liquid Nonaqueous Electrolyte>

A liquid nonaqueous electrolyte was prepared by dissolving 1.5 mol/L of $LiBF_4$, which was used as an eletrolyte, in a mixed solvent of ethylene carbonate (EC) and γ-butyrolactone (GBL), which were mixed at a volume ratio (EC:GBL) of 1:2. The liquid nonaqueous electrolyte was found to have a viscosity of 7.1 cp at 20° C.

The liquid nonaqueous electrolyte was poured into the laminate film pack housing the electrode group, followed by hermetically sealing the pack by the heat seal so as to obtain a nonaqueous electrolyte secondary battery constructed as shown in FIG. 1. The nonaqueous electrolyte secondary battery thus obtained was found to have a width of 35 mm, a thickness of 3.2 mm and a height of 65 mm.

The secondary battery thus obtained was subjected to the initial charge-discharge operation. Then, the secondary battery was charged under an environment of 25° C. for one hour under a constant voltage of 2.8 V, followed by discharging the secondary battery under a low rate of 0.2 A so as to measure the battery capacity. Table 1 shows the result. Also, a charge-discharge cycle test was conducted. In this cycle test, the secondary battery was charged under the conditions given above, followed by discharging the secondary battery under a constant current of 600 mA to 1.5 V. In this fashion, the secondary battery was repeatedly charged and discharged. In this charge-discharge cycle test, the number of charge-discharge cycles that were performed until the capacity of the secondary battery was not higher than 80% of the initial capacity was measured as the cycle life. Table 1 also shows the results of the measurement of the cycle life.

Also, the X-ray peak was measured as follows in respect of the negative electrode after the initial charge-discharge operation.

In this electrode, the XRD analysis of the lithium-titanium composite oxide using Cu—Kα was performed by using type number M18XHF[22]-SRA manufactured by Mac Science Inc. and the substance was identified by checking the result of the XRD analysis with a JCPDS card.

As a result, an X-ray peak derived from $Li_4Ti_5O_{12}$ and another X-ray peak derived from $Li_xMnO_2$ ($0 \leq x \leq 3$) were detected. It has been confirmed by the X-ray peak derived from $Li_xMnO_2$ that Li was absorbed in the lithium-absorbing material. It has also been confirmed that the lithium-titanium composite oxide and the lithium-absorbing material were contained in the negative electrode in the form of a mixture.

Examples 2 to 6 and Comparative Examples 1, 4, 5

A nonaqueous electrolyte secondary battery was manufactured as in Example 1, except that the weight ratio (A/B) of the negative electrode active material to the lithium-absorbing material was changed as shown in Tables 1 and 2.

Examples 7 to 11

A nonaqueous electrolyte secondary battery was manufactured as in Example 1, except that $MnO_2$ having a β-type structure (β-$MnO_2$) was used as the lithium-absorbing material and that the weight ratio (A/B) of the negative electrode active material to the lithium-absorbing material was changed as shown in Tables 1 and 2.

Examples 12 to 18

A nonaqueous electrolyte secondary battery was manufactured as in Example 1, except that used was the lithium-absorbing material shown in Table 1.

Example 19

A nonaqueous electrolyte secondary battery was manufactured as in Example 1, except that used as the nonaqueous electrolyte was a room temperature molten salt in which the molar ratio of 1-methyl-3-ethyl imidazolium ion ($MEI^+$), $Li^+$ and $BF_4^-$ (i.e., $MEI^+$: $Li^+$: $BF_4^-$) was set at 40:10:50. The viscosity of the nonaqueous electrolyte was found to be 20 cp at 20° C.

Example 20

A nonaqueous electrolyte secondary battery was manufactured as in Example 19, except that dimethyl ethyl methoxy methyl ammonium ion was used in place of 1-methyl-3-ethyl imidazolium ion ($MEI^+$) contained in the nonaqueous electrolyte. The viscosity of the nonaqueous electrolyte was found to be 20 cp at 20° C.

Example 21

A nonaqueous electrolyte secondary battery was manufactured as in Example 1, except that a lithium-cobalt composite oxide ($LiCoO_2$) was used as the positive electrode active material.

Example 22

A nonaqueous electrolyte secondary battery was manufactured as in Example 1, except that lithium iron phosphate ($LiFePO_4$) was used as the positive electrode active material.

Example 23

A nonaqueous electrolyte secondary battery was manufactured as in Example 1, except that the nonaqueous electrolyte used was prepared by dissolving 1 mol/L of $LiPF_6$, which was used as an electrolyte, in a mixed solvent of ethylene carbonate (EC) and diethyl carbonate (DEC), which were mixed at a volume ratio (EC:DEC) of 1:2. The viscosity of the nonaqueous electrolyte was found to be 1.9 cp at 20° C.

Example 24

A nonaqueous electrolyte secondary battery was manufactured as in Example 1, except that a lithium-titanium oxide ($Li_4Ti_5O_{12}$) powder having the spinel structure, which had an average particle size of 0.62 μm, a BET specific surface area by $N_2$ adsorption of 21.6 $m^2/g$, and a Li absorption potential of 1.55 V (vs. $Li/Li^+$), was used as the negative electrode active material.

Example 25

A nonaqueous electrolyte secondary battery was manufactured as in Example 1, except that a lithium-titanium oxide ($Li_4Ti_5O_{12}$) powder having the spinel structure, which had an average particle size of 0.41 μm, a BET specific surface area by $N_2$ adsorption of 35.2 $m^2/g$, and a Li absorption potential of 1.55 V (vs. $Li/Li^+$), was used as the negative electrode active material.

Example 26

A nonaqueous electrolyte secondary battery was manufactured as in Example 1, except that $Li_2Ti_3O_7$, which had an average particle size of 0.92 μm, a BET specific surface area by $N_2$ adsorption of 5.4 $m^2/g$, and a Li absorption potential of 1 to 2 V (vs. $Li/Li^+$), was used as the negative electrode active material.

Example 27

A nonaqueous electrolyte secondary battery was manufactured as in Example 1, except that a titanium-containing metal composite oxide ($TiO_2$ based oxide) having an average particle size of 0.22 μm, a BET specific surface area by $N_2$ adsorption of 48.9 $m^2/g$, and a Li absorption potential of 1 to 2 V (vs. $Li/Li^+$), was used as the negative electrode active material. The titanium-containing metal composite oxide had a micro-structure in which a microcrystalline phase and an amorphous phase, which were made of $TiO_2$ represented by $TiO_2$—$P_2O_5$—$SnO_2$—$NiO$—$CuO$, were present together.

Example 28

A nonaqueous electrolyte secondary battery was manufactured as in Example 1, except that a lithium-cobalt composite oxide ($LiCoO_2$) was used as the positive electrode active material and that the weight ratio (A/B) of the negative electrode active material to the lithium-absorbing material was set as shown in Table 2.

Example 29

A nonaqueous electrolyte secondary battery was manufactured as in Example 1, except that a lithium-cobalt composite oxide ($LiCoO_2$) was used as the positive electrode active material, the material shown in Table 2 was used as the lithium-absorbing material, and the weight ratio (A/B) of the negative electrode active material to the lithium-absorbing material was set as shown in Table 2.

Comparative Example EXAMPLE 2

A nonaqueous electrolyte secondary battery was manufactured as in Comparative Example 1, except that a lithium-cobalt composite oxide ($LiCoO_2$) was used as the positive electrode active material.

Comparative Example 3

A nonaqueous electrolyte secondary battery was manufactured as in Comparative Example 1, except that lithium iron phosphate ($LiFePO_4$) was used as the positive electrode active material.

Figure 7:
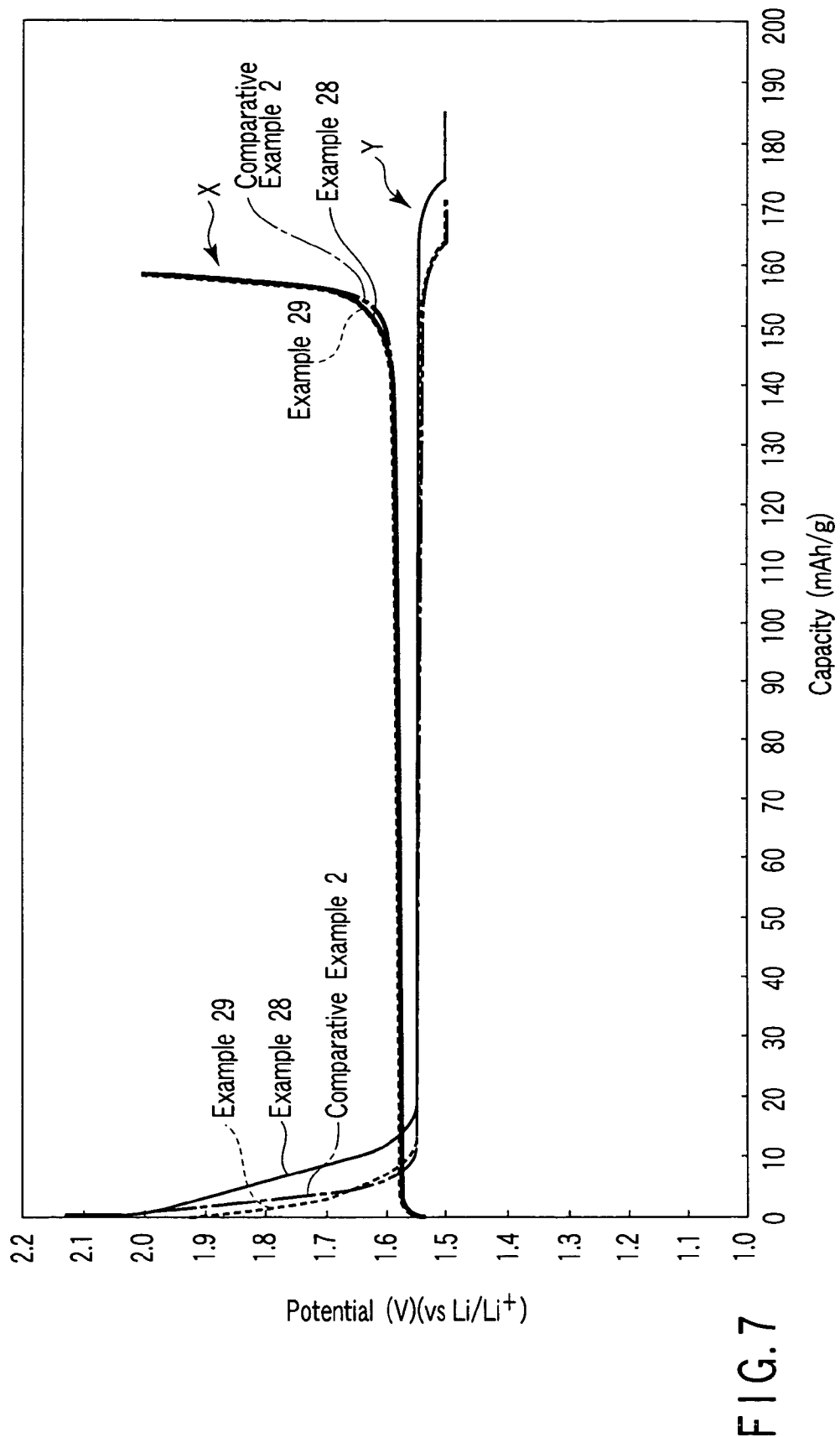
FIG. 7 is a graph showing the charge-discharge curves of the negative electrode for the secondary batteries for Examples 28, 29 and Comparative Example 2 relative to the lithium metal.

FIG. 7 is a graph showing the initial charge-discharge curve for Example 28, which was selected from among the initial charge-discharge curves of the negative electrode relative to the lithium metal for Examples 1 to 29 and Comparative Examples 1 to 5. Table 3 shows the initial charging capacity, the initial discharging capacity and the initial charge-discharge efficiency for this case. Incidentally, the initial charging capacity denotes the end value in the case of charging the secondary battery at a constant voltage of 1.5 V. In the graph of FIG. 7, the capacity (mAh/g) is plotted on the abscissa, and the potential (V) is plotted on the ordinate. The discharge curve is denoted by an arrow X and the charge curve is denoted by an arrow Y in FIG. 7. The initial charge-discharge curves for Example 29 and Comparative Example 2 are also shown in FIG. 7 together with the initial charge-discharge curve for Example 28. Table 3 also shows the initial charging capacity, the initial discharging capacity and the initial charge-discharge efficiency for this case.

The battery capacity of the secondary battery for each of Examples 2 to 29 and Comparative Examples 1 to 5 was measured after the initial charge-discharge operation and, then, a charge-discharge cycle test was conducted as in the secondary battery for Example 1. Tables 1 and 2 show the measured values of the battery capacity and the cycle life.

Figure 8:
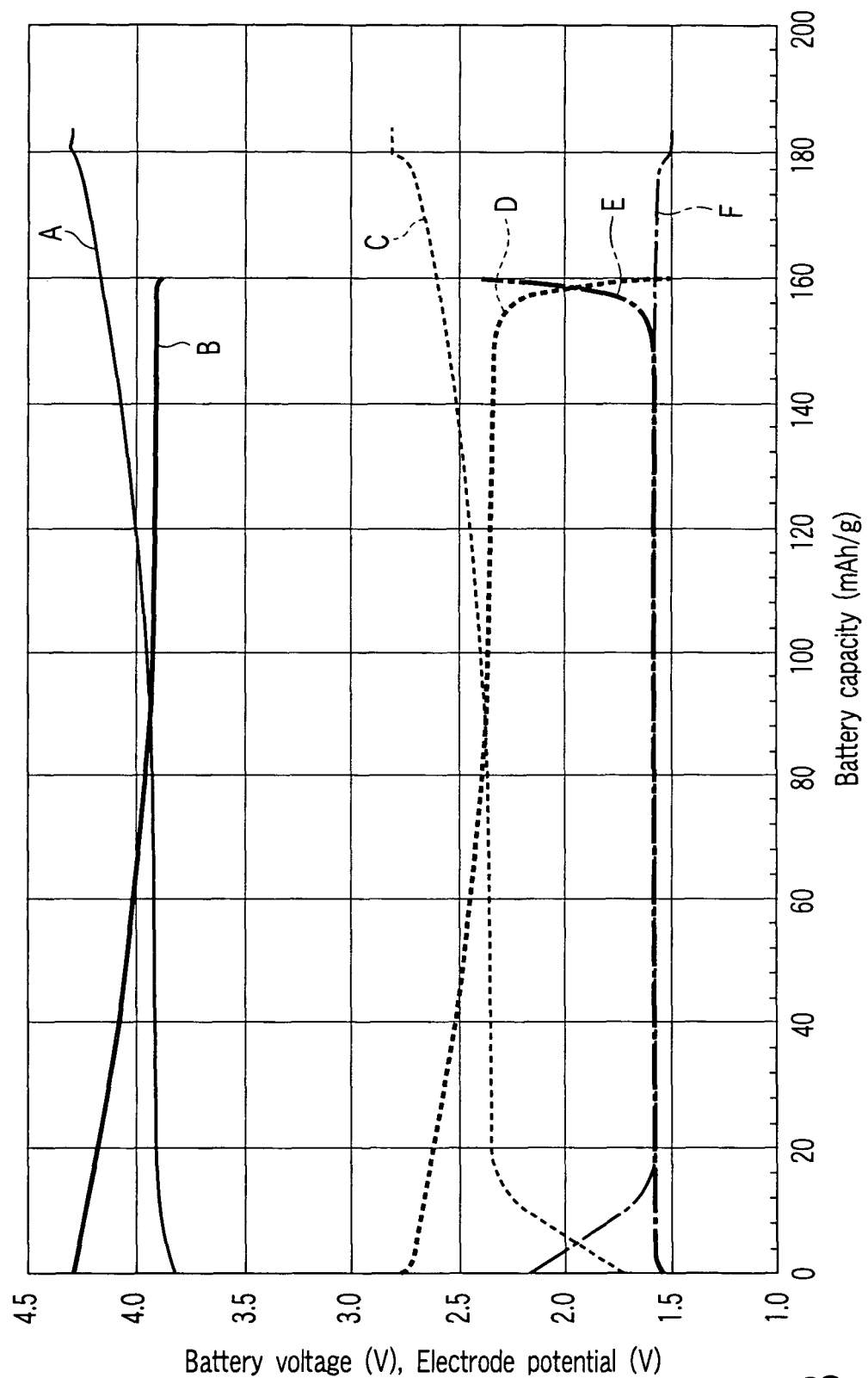
FIG. 8 is a graph showing the charge-discharge curves of the secondary battery for Example 28.
Figure 9:
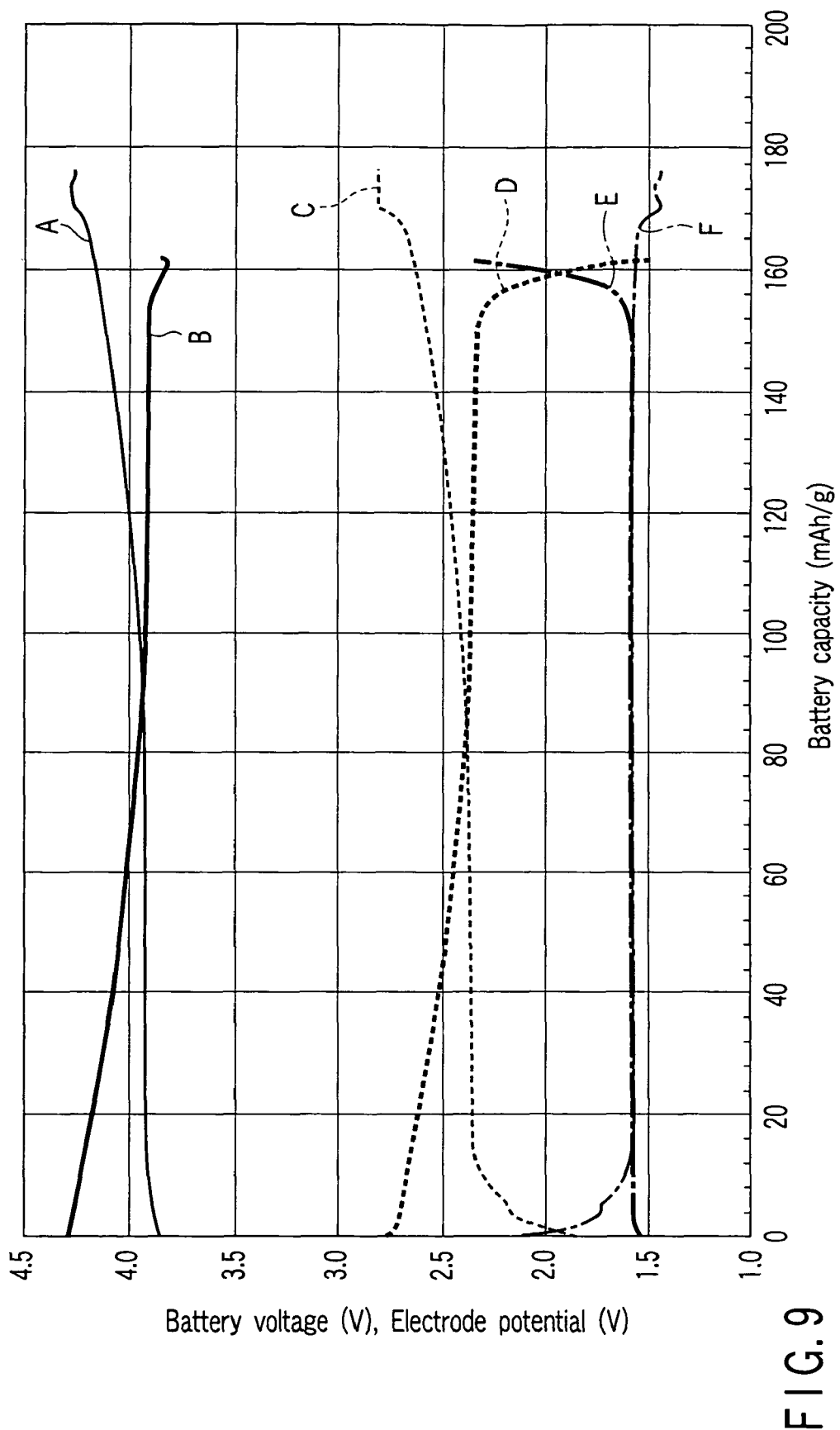
FIG. 9 is a graph showing the charge-discharge curves of the secondary battery for Example 29.

Also constructed were charge-discharge curves denoting the changes in the negative electrode potential, the positive electrode potential and the battery voltage relative to the battery capacity at the first cycle of the charge-discharge cycle test. FIG. 8 is a graph showing the charge-discharge curve for Example 28. In the graph of FIG. 8, the battery capacity (mAh/g) is plotted on the abscissa, and the battery voltage (V) or the electrode potential (V) is plotted on the ordinate. Curve A in FIG. 8 denotes the positive electrode potential (charging), curve B denotes the positive electrode potential (discharging), curve C denotes the battery voltage (charging), curve D denotes the battery voltage (discharging), curve E denotes the negative electrode potential (discharging), and curve F denotes the negative electrode potential (charging). FIG. 9 is a graph showing the charge-discharge curves for Example 29 and FIG. 10 is a graph showing the charge-discharge curves for Comparative Example 2, like the charge-discharge curves for Example 28 shown in FIG. 8.

TABLE 1

| | Positive electrode active material | Nonaqueous electrolyte | | Negative electrode active material | | |
|---|---|---|---|---|---|---|
| | Kind | Electrolyte | Solvent | Kind | Average particle size (μm) | Specific surface area (m²/g) |
| Example 1 | $LiNi_{1/3}Co_{1/3}Mn_{1/3}O_2$ | $LiBF_4$(1.5M) | EC/GBL(1:2) | $Li_4Ti_5O_{12}$ | 0.82 | 10.4 |
| Example 2 | $LiNi_{1/3}Co_{1/3}Mn_{1/3}O_2$ | $LiBF_4$(1.5M) | EC/GBL(1:2) | $Li_4Ti_5O_{12}$ | 0.82 | 10.4 |
| Example 3 | $LiNi_{1/3}Co_{1/3}Mn_{1/3}O_2$ | $LiBF_4$(1.5M) | EC/GBL(1:2) | $Li_4Ti_5O_{12}$ | 0.82 | 10.4 |
| Example 4 | $LiNi_{1/3}Co_{1/3}Mn_{1/3}O_2$ | $LiBF_4$(1.5M) | EC/GBL(1:2) | $Li_4Ti_5O_{12}$ | 0.82 | 10.4 |
| Example 5 | $LiNi_{1/3}Co_{1/3}Mn_{1/3}O_2$ | $LiBF_4$(1.5M) | EC/GBL(1:2) | $Li_4Ti_5O_{12}$ | 0.82 | 10.4 |
| Example 6 | $LiNi_{1/3}Co_{1/3}Mn_{1/3}O_2$ | $LiBF_4$(1.5M) | EC/GBL(1:2) | $Li_4Ti_5O_{12}$ | 0.82 | 10.4 |
| Example 7 | $LiNi_{1/3}Co_{1/3}Mn_{1/3}O_2$ | $LiBF_4$(1.5M) | EC/GBL(1:2) | $Li_4Ti_5O_{12}$ | 0.82 | 10.4 |
| Example 8 | $LiNi_{1/3}Co_{1/3}Mn_{1/3}O_2$ | $LiBF_4$(1.5M) | EC/GBL(1:2) | $Li_4Ti_5O_{12}$ | 0.82 | 10.4 |
| Example 9 | $LiNi_{1/3}Co_{1/3}Mn_{1/3}O_2$ | $LiBF_4$(1.5M) | EC/GBL(1:2) | $Li_4Ti_5O_{12}$ | 0.82 | 10.4 |
| Example 10 | $LiNi_{1/3}Co_{1/3}Mn_{1/3}O_2$ | $LiBF_4$(1.5M) | EC/GBL(1:2) | $Li_4Ti_5O_{12}$ | 0.82 | 10.4 |
| Example 11 | $LiNi_{1/3}Co_{1/3}Mn_{1/3}O_2$ | $LiBF_4$(1.5M) | EG/GBL(1:2) | $Li_4Ti_5O_{12}$ | 0.82 | 10.4 |
| Example 12 | $LiNi_{1/3}Co_{1/3}Mn_{1/3}O_2$ | $LiBF_4$(1.5M) | EC/GBL(1:2) | $Li_4Ti_5O_{12}$ | 0.82 | 10.4 |
| Example 13 | $LiNi_{1/3}Co_{1/3}Mn_{1/3}O_2$ | $LiBF_4$(1.5M) | EC/GBL(1:2) | $Li_4Ti_5O_{12}$ | 0.82 | 10.4 |
| Example 14 | $LiNi_{1/3}Co_{1/3}Mn_{1/3}O_2$ | $LiBF_4$(1.5M) | EC/GBL(1:2) | $Li_4Ti_5O_{12}$ | 0.82 | 10.4 |
| Example 15 | $LiNi_{1/3}Co_{1/3}Mn_{1/3}O_2$ | $LiBF_4$(1.5M) | EC/GBL(1:2) | $Li_4Ti_5O_{12}$ | 0.82 | 10.4 |
| Example 16 | $LiNi_{1/3}Co_{1/3}Mn_{1/3}O_2$ | $LiBF_4$(1.5M) | EC/GBL(1:2) | $Li_4Ti_5O_{12}$ | 0.82 | 10.4 |
| Example 17 | $LiNi_{1/3}Co_{1/3}Mn_{1/3}O_2$ | $LiBF_4$(1.5M) | EC/GBL(1:2) | $Li_4Ti_5O_{12}$ | 0.82 | 10.4 |
| Example 18 | $LiNi_{1/3}Co_{1/3}Mn_{1/3}O_2$ | $LiBF_4$(1.5M) | EC/GBL(1:2) | $Li_4Ti_5O_{12}$ | 0.82 | 10.4 |

| | Lithium-absorbing material | | | | | |
|---|---|---|---|---|---|---|
| | Kind | Li absorption potential (V) | Weight (Parts by weight) | Weight ratio (A/B) | Negative electrode density (g/cm³) | Discharging capacity (mAh) | Cycle life (The number of cycles) |
| Example 1 | γ-$MnO_2$ | 3.0 | 10 | 10 | 2.4 | 600 | 510 |
| Example 2 | γ-$MnO_2$ | 3.0 | 1 | 100 | 2.4 | 600 | 400 |
| Example 3 | γ-$MnO_2$ | 3.0 | 3 | 33 | 2.4 | 600 | 450 |
| Example 4 | γ-$MnO_2$ | 3.0 | 5 | 20 | 2.4 | 600 | 480 |
| Example 5 | γ-$MnO_2$ | 3.0 | 20 | 5 | 2.4 | 590 | 530 |

TABLE 1-continued

| | | | | | | | |
|---|---|---|---|---|---|---|---|
| Example 6 | γ-$MnO_2$ | 3.0 | 30 | 3 | 2.4 | 580 | 540 |
| Example 7 | β-$MnO_2$ | 3.0 | 3 | 33 | 2.4 | 600 | 420 |
| Example 8 | β-$MnO_2$ | 3.0 | 5 | 20 | 2.4 | 600 | 450 |
| Example 9 | β-$MnO_2$ | 3.0 | 10 | 10 | 2.4 | 600 | 470 |
| Example 10 | β-$MnO_2$ | 3.0 | 20 | 5 | 2.4 | 590 | 480 |
| Example 11 | β-$MnO_2$ | 3.0 | 30 | 3 | 2.4 | 580 | 490 |
| Example 12 | $LiNbO_3$ | 1.8 | 10 | 10 | 2.4 | 600 | 350 |
| Example 13 | $Nb_2O_5$ | 1.7 | 10 | 10 | 2.4 | 600 | 280 |
| Example 14 | $MoO_3$ | 2.4 | 10 | 10 | 2.4 | 600 | 400 |
| Example 15 | $V_2O_5$ | 3.4 | 10 | 10 | 2.4 | 600 | 450 |
| Example 16 | $V_6O_{13}$ | 3.0 | 10 | 10 | 2.4 | 600 | 420 |
| Example 17 | CuO | 2.0 | 10 | 10 | 2.4 | 600 | 400 |
| Example 18 | Anatase type $TiO_2$ | 1.8 | 10 | 10 | 2.4 | 600 | 400 |

TABLE 2

| | Positive electrode active material | Nonaqueous electrolyte | | Negative electrode active material | | |
|---|---|---|---|---|---|---|
| | Kind | Electrolyte | Solvent | Kind | Average particle size (μm) | Specific surface area ($m^2/g$) |
| Example 19 | $LiNi_{1/3}Co_{1/3}Mn_{1/3}O_2$ | MEI/Li/$BF_4$ | | $Li_4Ti_5O_{12}$ | 0.82 | 10.4 |
| Example 20 | $LiNi_{1/3}Co_{1/3}Mn_{1/3}O_2$ | dimethyl ethyl methoxy methyl ammonium ion/Li/$BF_4$ | | $Li_4Ti_5O_{12}$ | 0.82 | 10.4 |
| Example 21 | $LiCoO_2$ | $LiBF_4$(1.5M) | EC/GBL(1:2) | $Li_4Ti_5O_{12}$ | 0.82 | 10.4 |
| Example 22 | $LiFePO_4$ | $LiBF_4$(1.5M) | EC/GBL(1:2) | $Li_4Ti_5O_{12}$ | 0.82 | 10.4 |
| Example 23 | $LiNi_{1/3}Co_{1/3}Mn_{1/3}O_2$ | $LiBF_6$(1 M) | EC/DEC(1:2) | $Li_4Ti_5O_{12}$ | 0.82 | 10.4 |
| Example 24 | $LiNi_{1/3}Co_{1/3}Mn_{1/3}O_2$ | $LiBF_4$(1.5M) | EC/GBL(1:2) | $Li_4Ti_5O_{12}$ | 0.62 | 21.6 |
| Example 25 | $LiNi_{1/3}Co_{1/3}Mn_{1/3}O_2$ | $LiBF_4$(1.5M) | EC/GBL(1:2) | $Li_4Ti_5O_{12}$ | 0.41 | 35.2 |
| Example 26 | $LiNi_{1/3}Co_{1/3}Mn_{1/3}O_2$ | $LiBF_4$(1.5M) | EC/GBL(1:2) | $Li_2Ti_3O_7$ | 0.92 | 5.4 |
| Example 27 | $LiNi_{1/3}Co_{1/3}Mn_{1/3}O_2$ | $LiBF_4$(1.5M) | EC/GBL(1:2) | $TiO_2$ based oxide | 0.22 | 48.9 |
| Example 28 | $LiCoO_2$ | $LiBF_4$(1.5M) | EC/GBL(1:2) | $Li_4Ti_5O_{12}$ | 0.82 | 10.4 |
| Example 29 | $LiCoO_2$ | $LiBF_4$(1.5M) | EC/GBL(1:2) | $Li_4Ti_5O_{12}$ | 0.82 | 10.4 |
| Comparative Example 1 | $LiNi_{1/3}Co_{1/3}Mn_{1/3}O_2$ | $LiBF_4$(1.5M) | EC/GBL(1:2) | $Li_4Ti_5O_{12}$ | 0.82 | 10.4 |
| Comparative Example 2 | $LiCoO_2$ | $LiBF_4$(1.5M) | EC/GBL(1:2) | $Li_4Ti_5O_{12}$ | 0.82 | 10.4 |
| Comparative Example 3 | $LiFePO_4$ | $LiBF_4$(1.5M) | EC/GBL(1:2) | $Li_4Ti_5O_{12}$ | 0.82 | 10.4 |
| Comparative Example 4 | $LiNi_{1/3}Co_{1/3}Mn_{1/3}O_2$ | $LiBF_4$(1.5M) | EC/GBL(1:2) | $Li_4Ti_5O_{12}$ | 0.82 | 10.4 |
| Comparative Example 5 | $LiNi_{1/3}Co_{1/3}Mn_{1/3}O_2$ | $LiBF_4$(1.5M) | EC/GBL(1:2) | $Li_4Ti_5O_{12}$ | 0.82 | 10.4 |

| | Lithium-absorbing material | | | | Negative electrode density ($g/cm^3$) | Discharging capacity (mAh) | Cycle life (The number of cycles) |
|---|---|---|---|---|---|---|---|
| | Kind | Li absorption potential (V) | Weight (Parts by weight) | Weight ratio (A/B) | | | |
| Example 19 | γ-$MnO_2$ | 3.0 | 10 | 10 | 2.4 | 600 | 400 |
| Example 20 | γ-$MnO_2$ | 3.0 | 10 | 10 | 2.4 | 600 | 400 |
| Example 21 | γ-$MnO_2$ | 3.0 | 10 | 10 | 2.4 | 600 | 500 |
| Example 22 | γ-$MnO_2$ | 3.0 | 10 | 10 | 2.4 | 600 | 600 |
| Example 23 | γ-$MnO_2$ | 3.0 | 10 | 10 | 2.4 | 600 | 480 |
| Example 24 | γ-$MnO_2$ | 3.0 | 10 | 10 | 2.3 | 600 | 520 |
| Example 25 | γ-$MnO_2$ | 3.0 | 10 | 10 | 2.2 | 600 | 540 |
| Example 26 | γ-$MnO_2$ | 3.0 | 10 | 10 | 2.4 | 600 | 470 |
| Example 27 | γ-$MnO_2$ | 3.0 | 10 | 10 | 2 | 700 | 400 |
| Example 28 | γ-$MnO_2$ | 3.0 | 5 | 20 | 2.4 | 610 | 500 |
| Example 29 | Anatase type $TiO_2$ | 1.8 | 5 | 20 | 2.4 | 610 | 400 |
| Comparative Example 1 | — | — | 0 | — | 2.4 | 600 | 80 |
| Comparative Example2 | — | — | 0 | — | 2.4 | 600 | 100 |
| Comparative Example3 | — | — | 0 | — | 2.4 | 600 | 130 |
| Comparative Example4 | γ-$MnO_2$ | 3.0 | 50 | 2 | 2.4 | 480 | 300 |
| Comparative Example5 | γ-$MnO_2$ | 3.0 | 0.9 | 110 | 2.4 | 600 | 200 |

TABLE 3

| | Negative electrode active material | | Lithium-absorbing material | | Weight ratio (A/B) | Initial charging capacity (mAh/g) | Initial discharging capacity (mAh/g) | Initial charge-discharge efficiency (%) |
|---|---|---|---|---|---|---|---|---|
| | Kind | Weight (Parts by weight) | Kind | Weight (Parts by weight) | | | | |
| Comparative Example 2 | $Li_4Ti_5O_{12}$ | 100 | — | 0 | — | 168.49 | 158.53 | 94.09 |
| Example 28 | $Li_4Ti_5O_{12}$ | 100 | γ-$MnO_2$ | 5 | 20 | 185.59 | 158.67 | 85.50 |
| Example 29 | $Li_4Ti_5O_{12}$ | 100 | Anatase type $TiO_2$ | 5 | 20 | 174.02 | 158.57 | 90.70 |

The secondary battery for each of Examples 28 and 29 included the negative electrode containing the lithium-titanium composite oxide and the lithium-absorbing material in a weight ratio (A/B) falling within a range of 3 to 100. On the other hand, the secondary battery for Comparative Example 2 included the negative electrode that did not contain a lithium-absorbing material. Table 3 and FIG. 7 clearly support that the negative electrode for each of Examples 28 and 29 exhibited a high initial charging amount, compared with the negative electrode for Comparative Example 2, and was capable of lowering the initial charge-discharge efficiency.

Also, FIG. 8 supports that, in the secondary battery for Example 28 using the negative electrode containing γ-$MnO_2$, the discharge potential of the negative electrode (curve E) was allowed to rise promptly in the end period of the discharge. As a result, the battery voltage (curve D) was lowered to reach 1.5 V so as to cut off the secondary battery before the discharge potential of the positive electrode (curve B) was markedly dropped so that the over-discharge of the positive electrode was suppressed. Also, as apparent from FIG. 9, in the secondary battery for Example 29 using the negative electrode containing $TiO_2$ having the anatase structure, the discharge potential of the negative electrode (curve E) was elevated before the positive electrode potential (curve B) was markedly dropped so as to suppress the over-discharge of the positive electrode. The comparison between Examples 28 and 29 supports that the effect of suppressing the over-discharge of the positive electrode can be enhanced in the case of using γ-$MnO_2$ as the lithium-absorbing material. Charge-discharge curves similar to those for Examples 28 and 29 were also obtained in the secondary battery for Examples 1 to 27 so as to confirm that the initial charge-discharge efficiency of the negative electrode can be lowered and the over-discharge of the positive electrode can be suppressed.

On the other hand, in the secondary battery for Comparative Example 2 using the negative electrode that did not contain a lithium-absorbing material, the discharge potential of the positive electrode (curve B) was markedly dropped to a level in the vicinity of 3 V (vs. $Li/Li^+$) before the discharge potential of the negative electrode (curve E) was elevated, as shown in FIG. 10. The discharge potential of the positive electrode was markedly dropped in the secondary battery for each of Comparative Examples 1, and 3 to 5 like the discharge potential of the positive electrode for the secondary battery for Comparative Example 2.

The secondary battery for each of Examples 1 to 29 included the negative electrode containing the lithium-titanium composite oxide and the lithium-absorbing material in a weight ratio (A/B) falling within a range of 3 to 100. As apparent from Tables 1 and 2, the secondary battery for each of Examples 1 to 29 exhibited a large discharging capacity and a long cycle life, i.e., the large number of cycles of the charge-discharge operations until the battery capacity was not higher than 80% of the initial capacity, and exhibited excellent charge-discharge cycle characteristics.

Concerning the weight ratio (A/B) of the lithium-titanium composite oxide to the lithium-absorbing material, the comparison among Examples 1 to 6 supports that the secondary battery for each of Examples 1, 3, 4, 5 and 6, in which the weight ratio (A/B) fell within a range of 3 to 50, exhibited excellent charge-discharge cycle characteristics. Particularly, the secondary battery for each of Examples 1 and 4 to 6, in which the weight ratio (A/B) fell within a range of 3 to 20, exhibited highly excellent charge-discharge cycle characteristics.

Concerning the Li absorption potential of the lithium-absorbing material, comparison among the secondary batteries for Examples 1, 9, and 12 to 18 supports that the secondary battery for each of Examples 1, 9, 12 and 14 to 18, in which the Li absorption potential was not lower than 1.8 V (vs. $Li/Li^+$), exhibited particularly excellent charge-discharge cycle characteristics. Further, the secondary battery for each of Examples 1, 9, 15 and 16, in which the Li absorption potential of the lithium-absorbing material was not lower than 2.5 V (vs. $Li/Li^+$), exhibited highly excellent charge-discharge cycle characteristics.

Concerning the lithium-absorbing material, comparison among Examples 1, 9, and 12 to 18 supports that the secondary battery for each of Examples 1, 9, and 14 to 17, which used a manganese based oxide, a molybdenum based oxide, a vanadium based oxide, a titanium based oxide or a copper based oxide, exhibited excellent charge-discharge cycle characteristics. Particularly, the secondary battery for each of Examples 1 and 9, which used a substance represented by the formula $Li_xMnO_2$ ($0 \leq x \leq 3$) as the lithium-absorbing material, exhibited highly excellent charge-discharge cycle characteristics.

Concerning the negative electrode active material, comparison among Examples 1, 26 and 27 supports that the secondary battery for Example 1, which used a lithium-titanium composite oxide having the spinel structure, exhibited particularly prominent charge-discharge cycle characteristics.

Concerning the positive electrode active material, the experimental data for Examples 1, 21 and 22 support that excellent charge-discharge cycle characteristics can be obtained in the case of using any of a lithium-nickel-cobalt-manganese composite oxide, a lithium-cobalt composite oxide and a lithium-phosphorus composite oxide as the positive electrode active material.

As pointed out above, the experimental data clearly support that it is possible to obtain a nonaqueous electrolyte secondary battery excellent in the charge-discharge cycle characteristics and having a high discharging capacity by using a lithium-titanium oxide having the spinel structure as the lithium-titanium composite oxide, by using $MnO_2$ having a γ-type structure as the lithium-absorbing material, and by allowing the weight ratio (A/B) to fall within a range of 3 to 50.

Examples and Comparative Examples using the same lithium-absorbing material will now be described.

The secondary battery for each of Comparative Examples 1, 2, 3, which included the negative electrode that did not contain a lithium-absorbing material, was short in the cycle life and poor in the charge-discharge cycle characteristics, compared with the secondary battery for each of Examples 1 to 29.

The secondary battery for Comparative Example 4, which included the negative electrode in which the weight ratio (A/B) was smaller than 3, though the negative electrode certainly contained a lithium-absorbing material, was found to be inferior to the secondary battery for each of Examples 1 to 6 and 19 to 28 in not only the charge-discharge cycle characteristics but also in the discharging capacity.

Further, the secondary battery for Comparative Example 5, which included the negative electrode, in which the weight ratio (A/B) exceeded 100, though the negative electrode certainly contained a lithium-absorbing material, was found to be inferior to the secondary battery for each of Examples 1 to 6 and 19 to 28 in the charge-discharge cycle characteristics.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A nonaqueous electrolyte battery, comprising:
a positive electrode;
a negative electrode configured to regulate a discharge of the nonaqueous electrolyte battery, and containing a lithium-titanium composite oxide and a lithium-absorbing material in a weight ratio falling within a range defined in formula (1) given below, and the lithium-absorbing material having a lithium absorption potential nobler than a lithium absorption potential of the lithium-titanium composite oxide;
a nonaqueous electrolyte; and
a separator comprising a porous film comprising at least one of a polyethylene and a polypropylene;

$$3<(A/B)<100 \quad (1)$$

where A denotes the weight (parts by weight) of the lithium-titanium composite oxide, and B denotes the weight (parts by weight) of the lithium-absorbing material, and
wherein the negative electrode and the positive electrode are configured such that the discharge potential of the negative electrode rises before the positive electrode potential drops in the end period of discharge.

2. The nonaqueous electrolyte battery according to claim 1, wherein the lithium absorption potential of the lithium-absorbing material is not lower than 1.8 V (vs. Li/Li$^+$).

3. The nonaqueous electrolyte battery according to claim 1, wherein the lithium-absorbing material is formed of at least one material selected from the group consisting of a manganese based oxide, a molybdenum based oxide, a vanadium based oxide, a niobium based oxide, a titanium based oxide, and a copper based oxide.

4. The nonaqueous electrolyte battery according to claim 1, wherein the lithium-absorbing material is formed of a substance represented by the compositional formula of Li$_x$MnO$_2$ (0<x<3).

5. The nonaqueous electrolyte battery according to claim 1, wherein the lithium-titanium composite oxide has a spinel structure.

6. The nonaqueous electrolyte battery according to claim 1, wherein the negative electrode contains an electronic conductor and a binder.

7. The nonaqueous electrolyte battery according to claim 1, wherein the positive electrode contains a lithium-nickel containing composite oxide.

8. The nonaqueous electrolyte battery according to claim 1, wherein the positive electrode contains a substance represented by the compositional formula of Li$_a$Ni$_b$Co$_c$Mn$_d$O$_2$ (0<a<1.1; 0.1<b<0.5; 0<c<0.9; 0.1<d<0.5).

9. The nonaqueous electrolyte battery according to claim 1, further comprising a protective circuit for detecting the battery voltage.

10. The nonaqueous electrolyte battery according to claim 1, wherein the weight ratio of the lithium-titanium composite oxide to the lithium-absorbing material falls within a range defined in formula (3) given below:

$$3<(A/B)<20 \quad (3)$$

where A denotes the weight (parts by weight) of the lithium-titanium composite oxide, and B denotes the weight (parts by weight) of the lithium-absorbing material.

11. A battery pack including a battery module of nonaqueous electrolyte batteries, each nonaqueous electrolyte battery comprising:
a positive electrode;
a negative electrode configured to regulate a discharge of the nonaqueous electrolyte battery, and containing a lithium-titanium composite oxide and a lithium-absorbing material in a weight ratio falling within a range defined in formula (1) given below, and the lithium-absorbing material having a lithium absorption potential nobler than a lithium absorption potential of the lithium-titanium composite oxide;
a nonaqueous electrolyte; and
a separator comprising a porous film comprising at least one of a polyethylene and a polypropylene;

$$3<(A/B)<100 \quad (1)$$

where A denotes the weight (parts by weight) of the lithium-titanium composite oxide, and B denotes the weight (parts by weight) of the lithium-absorbing material, and
wherein the negative electrode and the positive electrode are configured such that the discharge potential of the negative electrode rises before the positive electrode potential drops in the end period of discharge.

12. The battery pack according to claim 11, wherein the lithium absorption potential of the lithium-absorbing material is not lower than 1.8 V (vs. Li/Li$^+$).

13. The battery pack according to claim 11, wherein the lithium-absorbing material is formed of at least one material selected from the group consisting of a manganese based oxide, a molybdenum based oxide, a vanadium based oxide, a niobium based oxide, a titanium based oxide and a copper based oxide.

14. The battery pack according to claim 11, wherein the lithium-absorbing material is formed of a substance represented by the compositional formula of Li$_x$MnO$_2$ (0<x<3).

15. The battery pack according to claim 11, wherein the lithium-titanium composite oxide has a spinel structure.

16. The battery pack according to claim 11, wherein the negative electrode contains an electronic conductor and a binder.

17. The battery pack according to claim 11, wherein the positive electrode contains a lithium-nickel containing composite oxide.

18. The battery pack according to claim 11, wherein the positive electrode contains a substance represented by the compositional formula of $Li_aNi_bCo_cMn_dO_2$ (0<a<1.1; 0.1<b<0.5; 0<c<0.9; 0.1<d<0.5).

19. The battery pack according to claim 11, further comprising a protective circuit for detecting the battery voltage.

20. A vehicle comprising the battery pack defined in claim 11.

21. The nonaqueous electrolyte battery according to claim 1, wherein during discharge lithium ions are released mainly from the lithium-titanium composite oxide.

22. The nonaqueous electrolyte battery according to claim 1, having an end discharge potential of the negative electrode in the range 2.0-2.5V (vs. $Li/Li^+$).

23. The battery pack according to claim 11, wherein during discharge lithium ions are released mainly from the lithium-titanium composite oxide.

24. The battery pack according to claim 11, having an end discharge potential of the negative electrode in the range 2.0-2.5V (vs. $Li/Li^+$).

25. The nonaqueous electrolyte battery according to claim 1, wherein the battery is chargeable and during charging releases lithium ions from the positive electrode active material during a charging stage and the released lithium ions are absorbed first by the lithium-absorbing material and then by the lithium-titanium composite oxide.

26. The nonaqueous electrolyte battery according to claim 1, wherein the battery is chargeable and during discharging lithium ions are released from mainly the lithium-titanium composite oxide alone and absorbed by the positive electrode active material.

27. The battery pack according to claim 11, wherein the battery is chargeable and during charging releases lithium ions from the positive electrode active material during a charging stage and the released lithium ions are absorbed first by the lithium-absorbing material and then by the lithium-titanium composite oxide.

28. The battery pack according to claim 11, wherein the battery is chargeable and during discharging lithium ions are released from mainly the lithium-titanium composite oxide alone and absorbed by the positive electrode active material.

29. The nonaqueous electrolyte battery according to claim 1, wherein the capacities of the negative electrode and the positive electrode are such that the discharge potential of the negative electrode rises before the positive electrode potential drops in the end period of discharge.

30. The battery pack according to claim 11, wherein the capacities of the negative electrode and the positive electrode are such that the discharge potential of the negative electrode rises before the positive electrode potential drops in the end period of discharge.

* * * * *